United States Patent
Onaka

(10) Patent No.: US 11,146,734 B2
(45) Date of Patent: Oct. 12, 2021

(54) IMAGE CAPTURING APPARATUS AND IMAGE MONITORING SYSTEM

(71) Applicant: CANON KABUSHIKI KAISHA, Tokyo (JP)

(72) Inventor: Tomoya Onaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/554,719

(22) Filed: Aug. 29, 2019

(65) Prior Publication Data

US 2020/0077027 A1    Mar. 5, 2020

(30) Foreign Application Priority Data

Sep. 5, 2018    (JP) ............................. JP2018-166122

(51) Int. Cl.
    *H04N 5/232* (2006.01)
(52) U.S. Cl.
    CPC ..... *H04N 5/23296* (2013.01); *H04N 5/23229* (2013.01)
(58) Field of Classification Search
    CPC ........................ H04N 5/23229; H04N 5/23296
    See application file for complete search history.

(56) References Cited

U.S. PATENT DOCUMENTS

| 8,928,951 | B2* | 1/2015 | Utsunomiya | ...... H04N 1/00572 |
| | | | | 358/461 |
| 2003/0016301 | A1* | 1/2003 | Aizaki | ................. G02B 21/365 |
| | | | | 348/345 |
| 2003/0178550 | A1* | 9/2003 | Yamamoto | ........... H04N 1/6094 |
| | | | | 250/208.1 |
| 2005/0013505 | A1* | 1/2005 | Nishimura | .............. G06T 5/008 |
| | | | | 382/274 |
| 2013/0141590 | A1* | 6/2013 | Matsumoto | .............. H04N 5/33 |
| | | | | 348/164 |
| 2018/0321161 | A1* | 11/2018 | Okada | .................... G01N 21/88 |

FOREIGN PATENT DOCUMENTS

JP         2015216544 A    12/2015

* cited by examiner

*Primary Examiner* — Joon Kwon
(74) *Attorney, Agent, or Firm* — Carter, DeLuca & Farrell LLP

(57) ABSTRACT

An image-capturing apparatus comprises an image sensor, a driver configured to incline at least one of the image sensor and an image-capturing optical system with respect to a plane perpendicular to an optical axis of the image-capturing optical system, and a corrector configured to perform shading correction on an image-capturing signal based on an inclination angle of the at least one of the image sensor and the image-capturing optical system with respect to the plane.

11 Claims, 18 Drawing Sheets

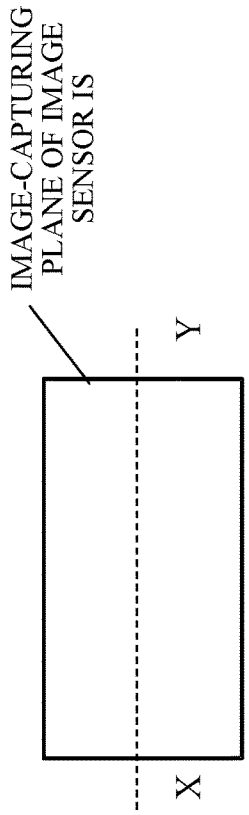
FIG. 10A
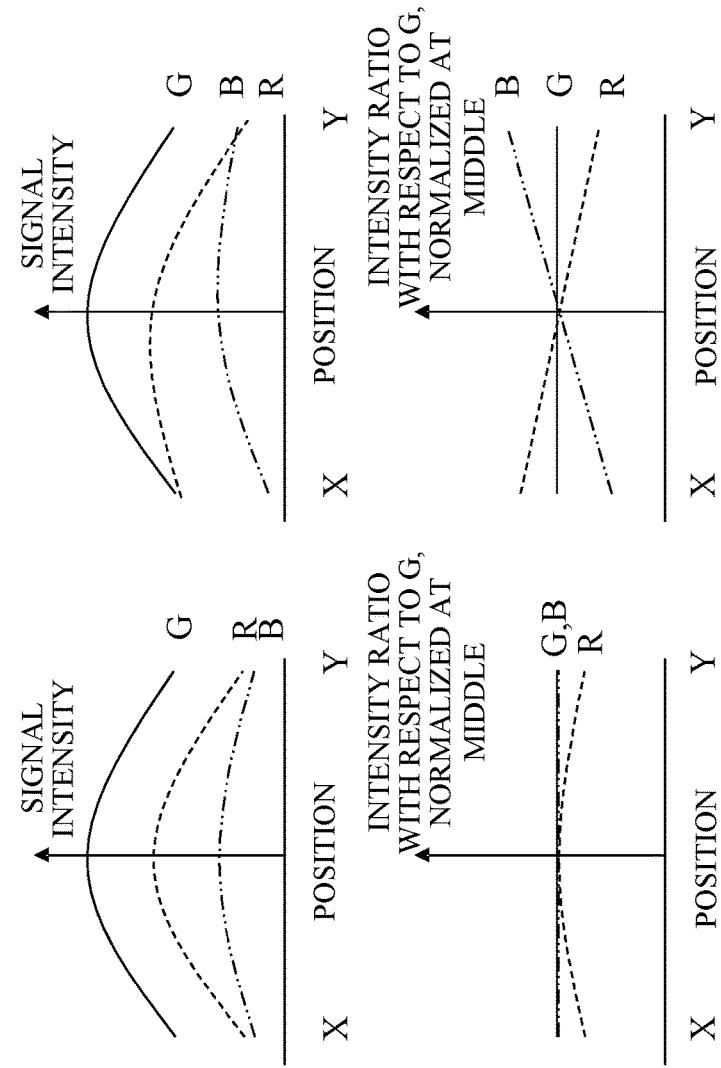
FIG. 10B
FIG. 10C
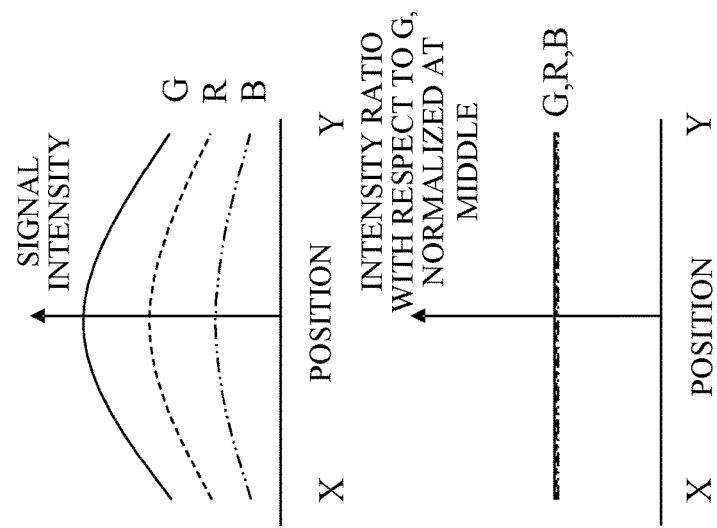
FIG. 10D

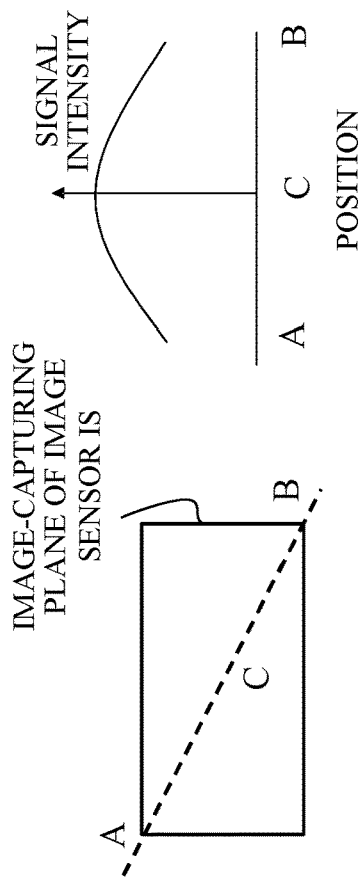
FIG. 11A
FIG. 11B
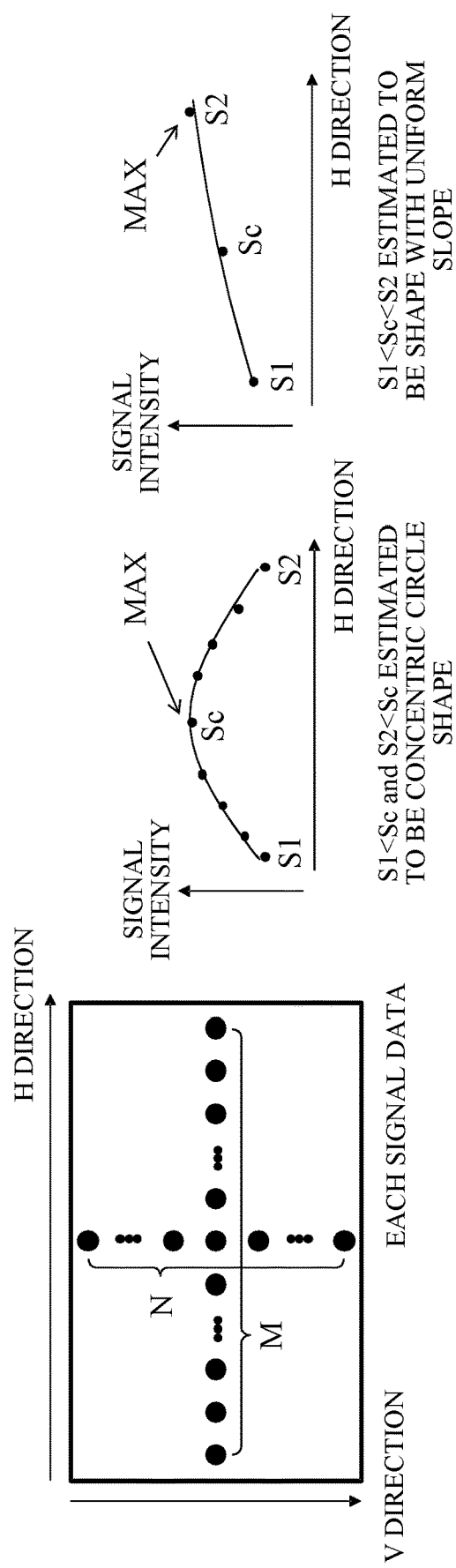
FIG. 12A
FIG. 12B
FIG. 12C

IMAGE CAPTURING APPARATUS AND IMAGE MONITORING SYSTEM

BACKGROUND OF THE INVENTION

Field of the Invention

The present invention relates to an image capturing apparatus such as a monitoring camera, and an image monitoring system including the same.

Description of the Related Art

A network camera acquires an image by imaging incident light passing through a lens on an image sensor. In the acquired image, an imaging state of an object which is in a depth of field is good, but an imaging state of an object which is outside the depth of field is poor. When using a camera equipped with an image sensor having a small pixel pitch or using an open aperture, an image-capturing range outside the depth of field tends to occur in an image-capturing screen range, and it is likely to occur that a part of the image-capturing target is well recognized. Even in such a case, if a plurality of cameras are set and an object is within the depth of field of any of the cameras, a good image can be obtained. However, in order to reduce the number of cameras, a situation that an object is recognized well by one camera is desirable. Therefore, a camera with a large depth of field is desired.

Conventionally, a camera provided with a tilt image-capturing function for increasing depth of field by relatively tilting a lens or an image sensor is known. By using the tilt image-capturing function, an imaging state can be improved even when an aperture is open. However, shading such as color shading occurs by performing the tilt image-capturing. Japanese Patent Laid-Open No. 2015-216544 discloses an image-capturing apparatus which has an image sensor arranged so as to be inclined with respect to a principal surface perpendicular to an optical axis of an optical system that receives light, and performs shading correction for a shading that occurs in a captured image.

However, in the image-capturing apparatus disclosed in Japanese Patent Laid-Open No. 2015-216544, in a case where a tile angle of the image sensor with respect to the optical system can be freely changed, optical characteristics changes depending on parameters of the image-capturing apparatus such as tilt angle, lens position and aperture amount. Therefore, the shading is not uniformly determined, and image quality is degraded.

SUMMARY OF THE INVENTION

The present invention provides an image-capturing apparatus and an image monitoring system capable of freely changing an inclination angle of at least one of an image sensor and a lens with respect to a plane perpendicular to an optical axis of the lens and reducing image quality deterioration due to shading.

An image-capturing apparatus as one aspect of the present invention comprises an image sensor; a driver configured to incline at least one of the image sensor and an image-capturing optical system with respect to a plane perpendicular to an optical axis of the image-capturing optical system; and a corrector configured to perform shading correction on an image-capturing signal based on an inclination angle of the at least one of the image sensor and the image-capturing optical system with respect to the plane.

Further features of the present invention will become apparent from the following description of exemplary embodiments with reference to the attached drawings.

BRIEF DESCRIPTION OF THE DRAWINGS

FIGS. 10A to 10D are explanatory views of color shading.

FIGS. 11A and 11B are explanatory diagrams of luminance shading.

FIGS. 12A to 12C show examples of sample data positions for color shading correction.

DESCRIPTION OF THE EMBODIMENTS

Figure 1:
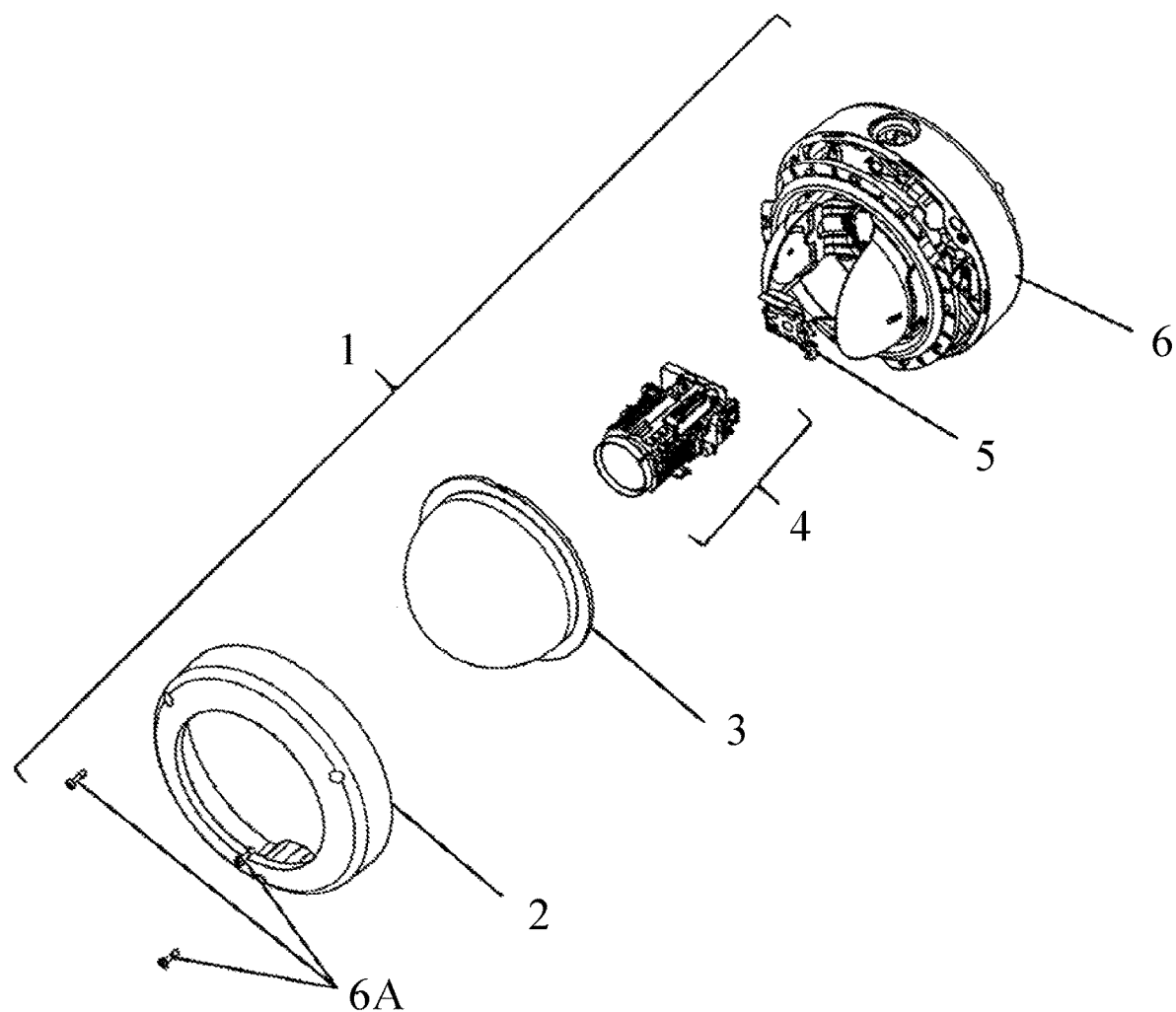
FIG. 1 is an exploded perspective view of a network monitoring camera which is an example of an image-capturing apparatus according to a first embodiment.

Hereinafter, embodiments of the present invention will be described in detail with reference to the drawings. In each of the drawings, the same members are denoted by the same reference numerals, and redundant description will be omitted.

First Embodiment

<Schematic Configuration of Image-Capturing Apparatus>

FIG. 1 is an exploded perspective view of a network monitoring camera (hereinafter, monitoring camera) 1 which is connected to a network as an example of an image-capturing apparatus according to the present embodiment. The monitoring camera 1 has a fixed cover 2, a dome cover 3, a lens barrel 4, an image sensor unit 5, and a pan/tilt/rotation unit 6.

The image sensor unit 5 is attached to the lens barrel 4. The lens barrel 4 is held by the pan/tilt/rotation unit 6 so as to be rotatable in a pan direction, a tilt direction, and a rotation direction. The pan/tilt/rotation unit 6 is fixed at a fixed position such as a ceiling of a building. The dome cover 3 protects the lens barrel 4. The dome cover 3 is fitted into the fixed cover 2 and the fixed cover 2 is fixed to the pan/tilt/rotation unit 6 by a plurality of screws 6A. Thus, the dome cover 3 is sandwiched and fixed between the fixed cover 2 and the pan/tilt/rotation unit 6. In the following description, a side of the fixed cover 2 (object side) is a front side, and a side of the pan/tilt/rotation unit 6 (image sensor side) is a rear side.

Light transmitted through the dome cover 3 passes through the lens barrel 4 and is received by a later-described image sensor IS of the image sensor unit 5 to form an image, and thus the monitoring camera 1 can capture an image. In this embodiment, the monitoring camera 1 adjusts a correction value for shading in accordance with a tilt angle (inclination angle) of the image sensor IS. The monitoring camera 1 is often installed so as to capture an image in a downward direction. In the following description, an inclination direction of the image sensor IS with respect to the lens barrel 4 for tilt image capturing is assumed to be a direction (hereinafter referred to as "tilt direction") that rotates about an axis parallel to the ground (tilt axis). An image-capturing direction of the monitoring camera 1 may be another direction. Further, the inclination direction of the image sensor IS for tilt image capturing is not limited to the tilt direction, and may be a rotation direction around an axis orthogonal to the tilt axis in a plane orthogonal to the optical axis of the lens barrel 4 Also, in this embodiment, the image sensor IS is inclined with respect to the lens barrel 4 for tilt image capturing, but the lens barrel 4 may be inclined with respect to the image sensor IS.

<Configuration of Lens Barrel>

Figure 2:
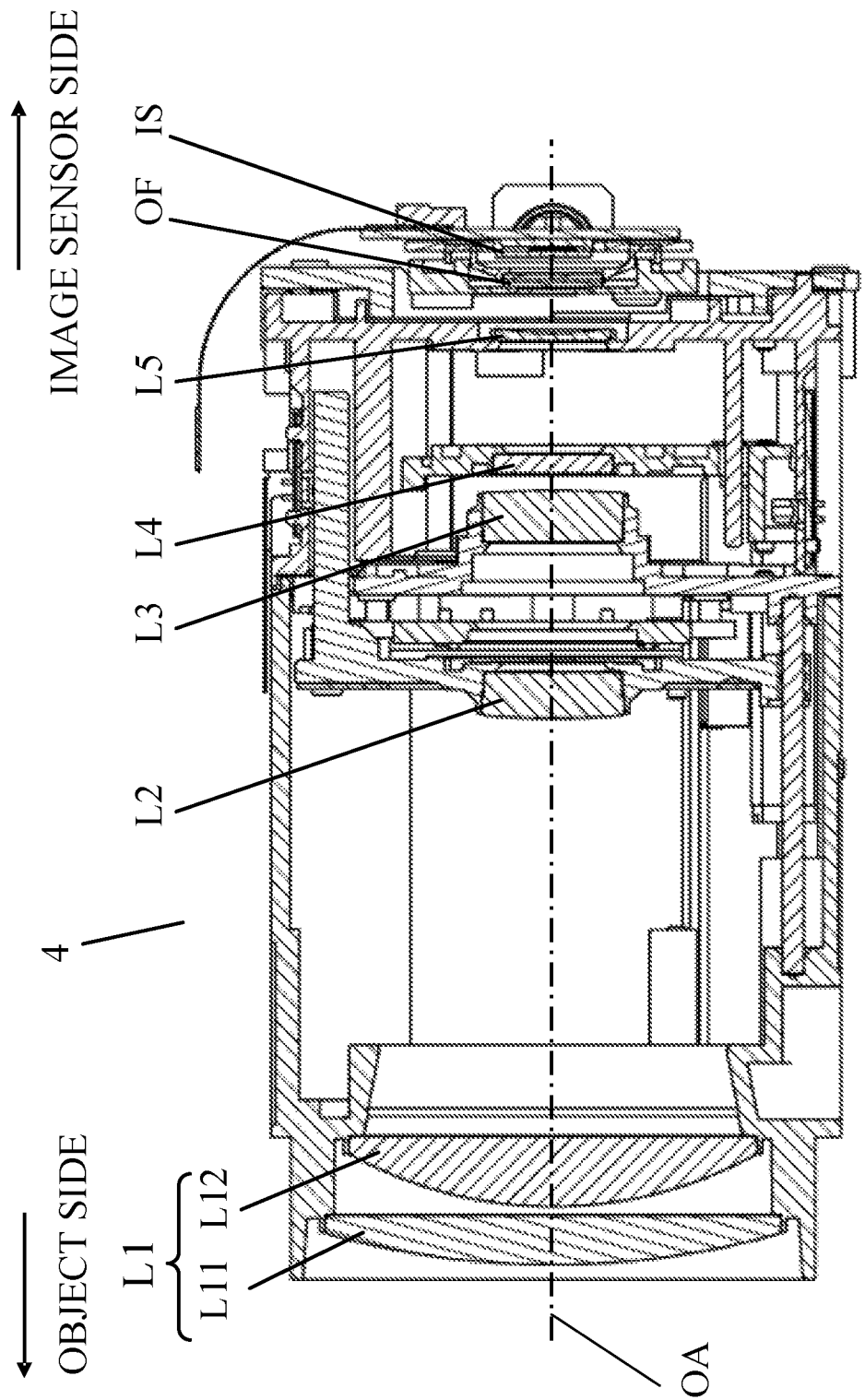
FIG. 2 is a longitudinal sectional view of a lens barrel on which an image sensor unit is mounted.
Figure 3:
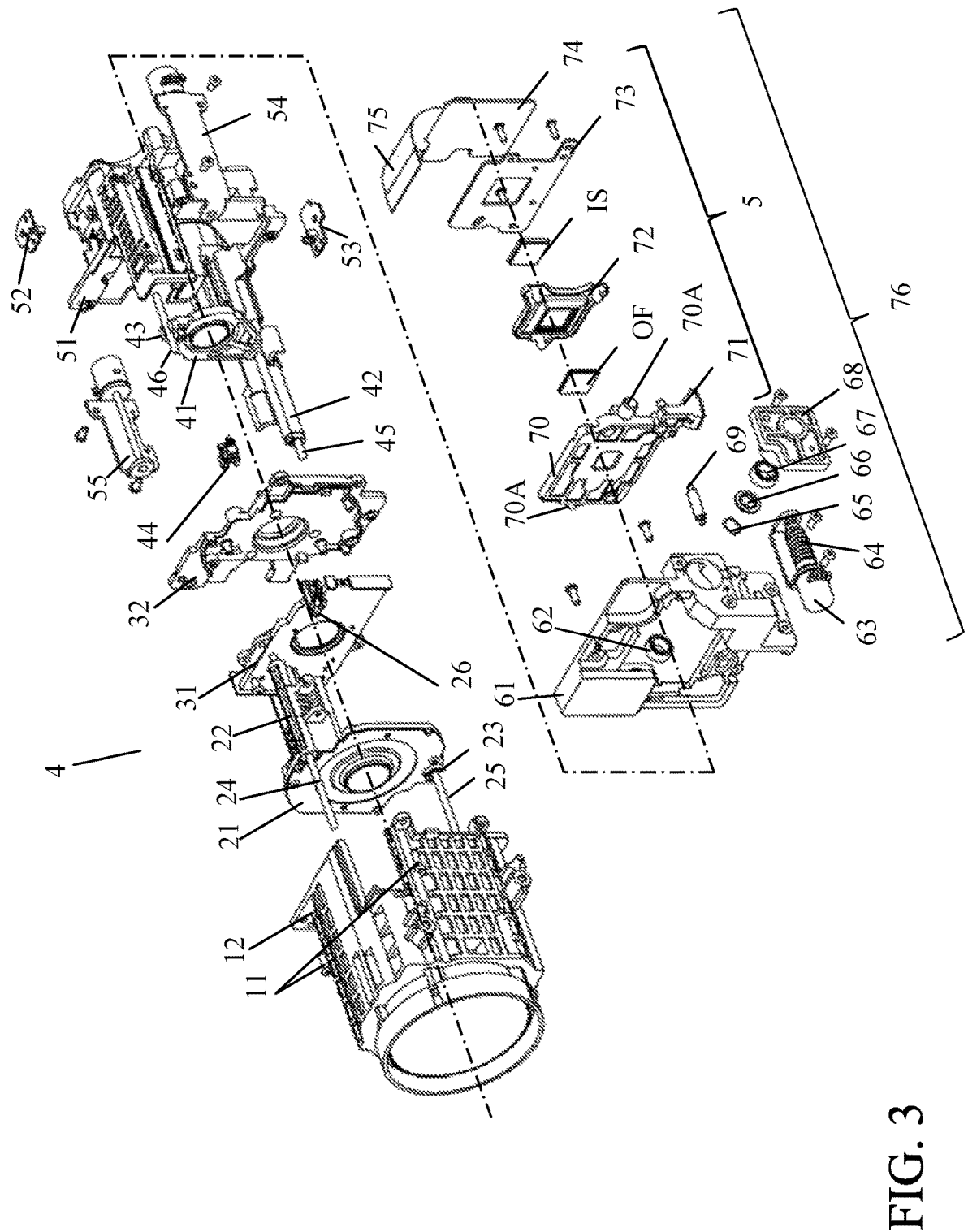
FIG. 3 is an exploded perspective view of a lens barrel and an image sensor unit.

FIG. 2 is a longitudinal sectional view of the lens barrel 4 on which the image sensor unit 5 is mounted. FIG. 3 is an exploded perspective view of the lens barrel 4 and the image sensor unit 5.

As shown in FIG. 2, the lens barrel 4 has, in order from the front side to the rear side, a first lens unit L1, a second lens unit L2, a third lens unit L3, a fourth lens unit L4, and a fifth lens unit L5. The first lens unit L1 to the fifth lens unit L5 constitute an image-capturing optical system. The first lens unit L1 is fixed in a direction (optical axis direction) along the optical axis OA. The second lens unit L2 moves in the optical axis direction to perform a magnification varying operation (zooming). The third lens unit L3 is fixed in the optical axis direction. The fourth lens unit L4 moves in the optical axis direction to perform an in-focus operation (focusing). The fifth lens unit L5 is fixed in the optical axis direction.

In this embodiment, the first lens unit L1 has two lenses L11 and L12, and the second lens unit L2, the third lens unit L3, the fourth lens unit L4 and the fifth lens unit L5 each has one lens. However, the number of lenses constituting each lens unit is not limited to the number in this embodiment. Also, the number of lens units is not limited to the number in this embodiment.

An optical filter OF and the image sensor IS are disposed on the rear side of the fifth lens unit L5. The optical filter OF is, for example, an IR cut filter or a low pass filter, fixed in the optical axis direction, and transmits, shields, or attenuates a light beam in a specific wavelength range. The image sensor IS is a photoelectric conversion element such as a complementary metal oxide semiconductor (CMOS) image sensor or a charge-coupled device (CCD) image sensor. The image sensor IS photoelectrically converts an optical image formed through an image-capturing optical system to generate an image-capturing signal.

As shown in FIG. 3, the lens barrel 4 has a first barrel 12, a second barrel 21, a third barrel 32, a fourth barrel 41 and a fifth barrel 51. The fifth barrel 51 fixes an image capturer 76.

The first lens barrel 12 holds the first lens unit L1. The second barrel 21 holds the second lens unit L2. The second barrel 21 is provided with a sleeve portion 22 and a U-shaped groove 23. A guide bar 24 is inserted into the sleeve portion 22 and supported by the first barrel 12 and the fifth barrel 51. Thus, the second barrel 21 is supported movably in the optical axis direction. A guide bar 25 is inserted into the U-shaped groove 23 and supported by the first barrel 12 and the third barrel 32. Thereby, a rotation of the second barrel 21 about the guide bar 24 is restricted.

A rack member 26 is attached to the second barrel 21. The rack member 26 meshes with a screw fixed to a rotation shaft of a stepping motor 54. Therefore, with the rotation of the rotation shaft of the stepping motor 54, the second barrel 21 moves in the optical axis direction together with the rack member 26.

The third barrel 32 holds the third lens unit L3 and is sandwiched and held between the first barrel 12 and the fifth barrel 51. An aperture unit (light amount adjustment unit) 31 is fixed to the third barrel 32. The aperture unit 31 adjusts an amount of light passing through the lens barrel 4. By driving aperture blades (not shown) of the aperture unit 31 to change an aperture diameter, an aperture value is controlled.

The fourth barrel 41 holds the fourth lens unit L4. The fourth barrel 41 is provided with a sleeve portion 42 and a U-shaped groove 43. A guide bar 45 is inserted into the sleeve portion 42 and supported by the first barrel 12 and the fifth barrel 51. Thus, the fourth barrel 41 is supported so as to be movable in the optical axis direction. A guide bar 46 is inserted into the U-shaped groove 43 and supported by the third barrel 32 and the fifth barrel 51. Thus, a rotation of the fourth barrel 41 about the guide bar 45 is restricted.

A rack member 44 is attached to the fourth barrel 41. The rack member 44 engages with a screw fixed to a rotation shaft of a stepping motor 55. Accordingly, the fourth barrel 41 moves in the optical axis direction together with the rack member 44 as the rotation shaft of the stepping motor 55 rotates.

The fifth barrel 51 holds the fifth lens unit L5 and is fixed to the first barrel 12 by screws 11. The stepping motors 54 and 55 and an unshown FPC (flexible printed circuit board) 56 are fixed to the fifth barrel 51.

Photo-interrupters 52 and 53 are fixed to the FPC 56 by soldering. The FPC 56 is electrically connected to the aperture unit 31, the stepping motors 54 and 55, and the photo-interrupters 52 and 53. Energization from the FPC 56 activates the aperture unit 31, the stepping motors 54, 55 and the photo-interrupters 52, 53.

The photo-interrupter 52 is provided to measure a position of the second barrel 21 and the second lens unit L2 and control the stepping motor 54 which moves the second barrel 21. The photo-interrupter 52 is disposed on a movement area of the second barrel 21. By controlling the number of driving pulses of the stepping motor 54 with reference to an output of the photo interrupter 52, the position of the second barrel 21 can be controlled.

The photo-interrupter 53 is provided to measure a position of the fourth barrel 41 and the fourth lens unit L4 and control the stepping motor 55 which moves the fourth barrel 41. The photo-interrupter 53 is disposed on a movement area of the fourth barrel 41. By controlling the number of driving pulses of the stepping motor 55 with reference to an output of the photo interrupter 53, the position of the fourth barrel 41 can be controlled.

The image capturer 76 includes an image sensor tilt base 61, a stepping motor (driver) 63, and the image sensor unit 5. The tilt base 61 is fixed to the fifth barrel 51. The image sensor unit 5 includes an image sensor holder 70, the optical filter OF, a filter holder 72, the image sensor IS, an image sensor fixing plate 73, and a sensor FPC 75. The image sensor unit 5 is supported by the image sensor tilt base 61 so as to be tiltable in the tilt direction with respect to the optical axis OA for tilt image capturing.

Figure 4:
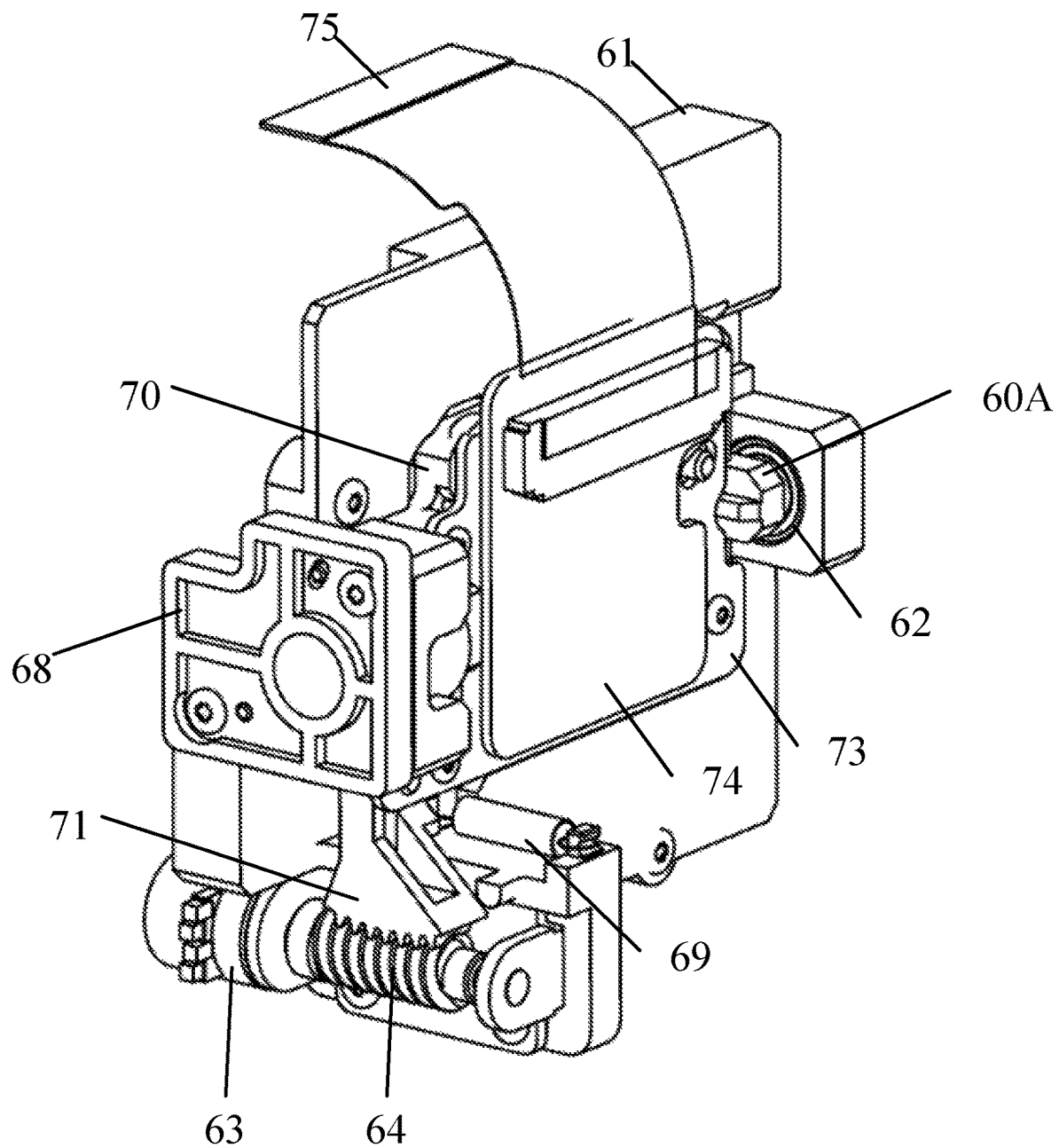
FIG. 4 is a perspective view of an image capturer.
Figure 5:
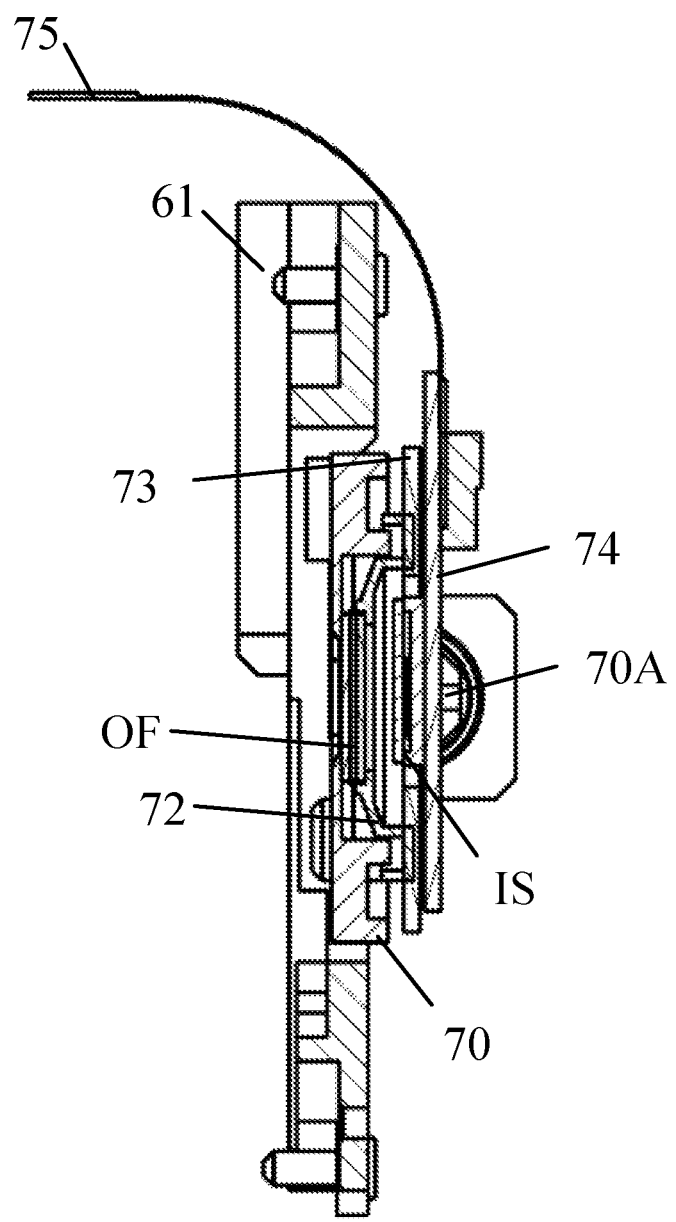
FIG. 5 is a longitudinal sectional view of an image capturer.

Hereinafter, with reference to FIGS. 3 to 5, the image capturer 76 will be described in detail. FIGS. 4 and 5 are a perspective view and a longitudinal sectional view of the image capturer 76, respectively.

The optical filter OF is fixed to the image sensor holder 70. Specifically, the optical filter OF is held by the filter holder 72 made of a rubber. The image sensor IS is fixed to an image sensor fixing plate 73 made of a sheet metal by an adhesive. By fixing the image sensor fixing plate 73 to the image sensor holder 70 in a state where the filter holder 72 is in contact with the image sensor holder 70, the filter holder 72 is sandwiched between the image sensor holder 70 and the image sensor fixing plate 73. With such a structure, the optical filter OF and the image sensor IS are attached to the image sensor holder 70 at a fixed position.

The image sensor IS is soldered to a circuit board 74 and is electrically connected to a circuit on the circuit board 74. The sensor FPC 75 is bonded to the circuit board 74. The circuit board 74 is electrically connected to the above-described FPC 56 through a wiring on the sensor FPC 75.

The image sensor holder 70 has two concentric axes 70A. The image sensor holder 70 is rotatable in the tilt direction with respect to the image sensor tilt base 61 about the axis 70A. Therefore, the image sensor IS attached to the image sensor holder 70 is also rotatable in the tilt direction about the axis 70A with respect to the image sensor tilt base 61 and thus with respect to the lens barrel 4. In this manner, the image sensor IS is inclined with respect to the lens barrel 4, and the monitoring camera 1 can perform tilt image capturing.

More specifically, one axis 70A of the image sensor holder 70 is supported by a bearing 62 supported by the image sensor tilt base 61, and the other axis 70A is supported by a bearing 67 supported by a bearing holder 68 fixed to the image sensor tilt base 61. A wave washer 65 and a bearing washer 66 are disposed between the image sensor holder 70 and the bearing 67, and bias the image sensor holder 70 in a axial direction of the axis 70A.

In addition, the stepping motor 63 is fixed to the image sensor tilt base 61. A worm gear 64 is fixed to the rotation shaft of the stepping motor 63 by press fitting or the like. An engagement portion 71 is integrally provided in the image sensor holder 70. The engagement portion 71 engage with the worm gear 64. The FPC 56 is electrically connected to the stepping motor 63. Energizing the stepping motor 63 rotates the worm gear 64 and the engagement portion 71 is moved. In this manner, when the engagement portion 71 moves with the rotation of the stepping motor 63, the image sensor unit 5 is inclined with respect to the optical axis about the axis 70A.

A tension spring 69 made of metal is bridged between the image sensor tilt base 61 and the image sensor holder 70. The tension spring 69 applies a biasing force in a counterclockwise direction to the image sensor holder 70 in FIG. 5. When the engagement portion 71 moves forward, the engagement portion 71 rotated the image sensor holder 70 in a clockwise direction against the biasing force of the tension spring 69 in FIG. 5.

When the engagement portion 71 moves backward, the image sensor holder 70 is rotated counterclockwise in FIG. 5. A backlash exists between the engagement portion 71 and the worm gear 64. However, the tension spring 69 gives a biasing force in the counterclockwise direction to the image sensor holder 70, and so when the engagement portion 71 is moves backward, the image sensor holder 70 rapidly rotates in response to the backward movement of the image sensor holder 70. Therefore, a response of a tilt operation of the image sensor holder 70 is high when the engagement portion 71 moves backward.

Instead of the tension spring 69 made of metal, a tension member made of an elastic material such as rubber may be used.

A not-shown photo-interrupter (measurer) 77 is fixed to the image sensor tilt base 61. The photo-interrupter 77 is provided to measure a tilt angle of the image sensor holder 70 and this the image sensor IS and control the stepping motor 63 that tilts the image sensor holder 70. The photo-interrupter 77 is disposed on a movement area of the image sensor holder 70 and detects a position of a not-shown detection target piece provided on the image sensor holder 70. The position of the detection target piece 78 is an initial tilt reference angle of the image sensor holder 70. By controlling the number of drive pulses of the stepping motor 63 with reference to an output of the photo-interrupter 77, the tilt angle of the image sensor holder 70 can be controlled.

<Control System of Image Monitoring System>

Figure 6:
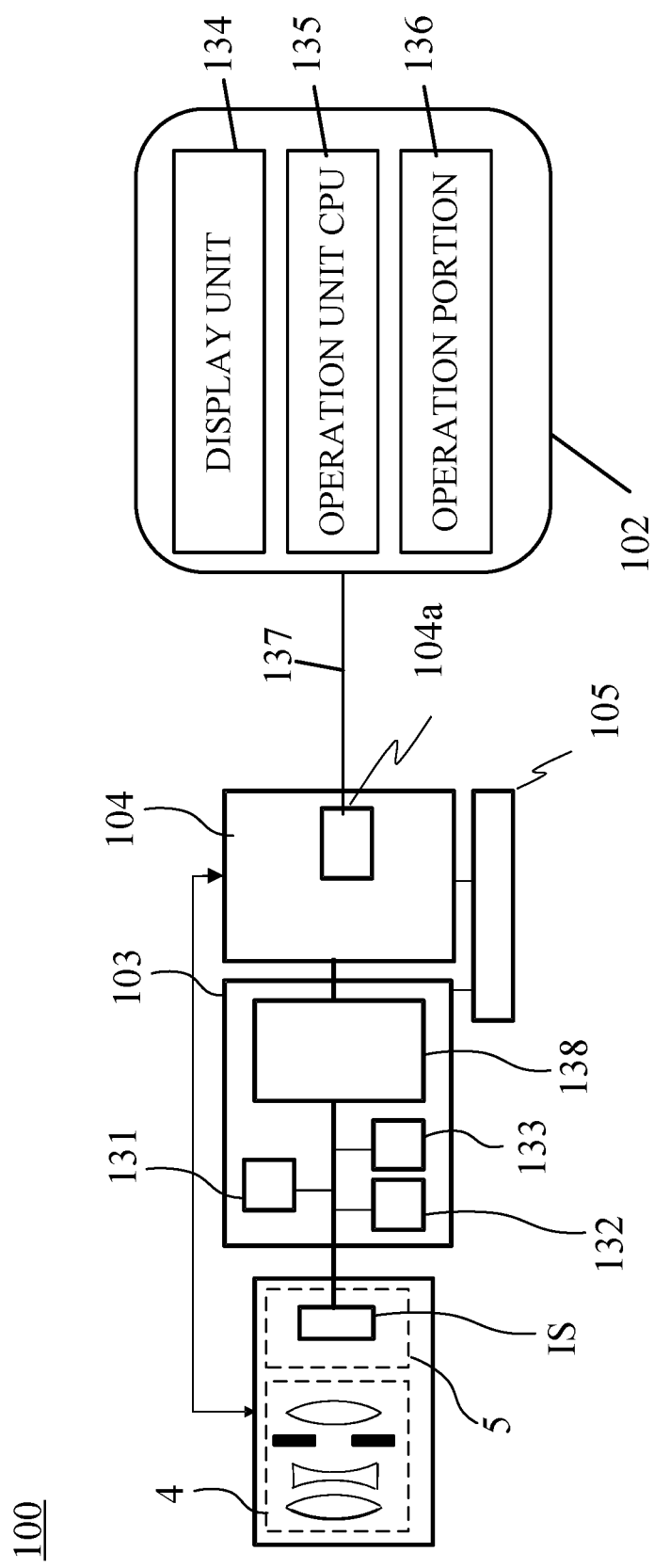
FIG. 6 is a block diagram of an image monitoring system according to a first embodiment.

FIG. 6 is a block diagram of the image monitoring system 100 according to this embodiment. The image sensor IS converts light imaged by the lens barrel 4 into an electric signal, and transmits to an image processing circuit 103. A control circuit 104 controls operations of the lens barrel 4, the image sensor unit 5, the pan/tilt/rotation unit 6, the image sensor IS and the image processing circuit (corrector) 103, and saves or transfers an image which is output from the image processing circuit 103. The storage unit 105 stores data necessary for processing of the image processing circuit 103 and the control circuit 104, and also stores the processed image.

The image sensor IS includes color filters for two or more colors. In this embodiment, the image sensor IS includes color filters for red (R), green (G) and blue (B), converts an image into electric signals for RGB, and outputs the electric signals. In the lens barrel 4, a zoom magnification ratio, an aperture amount and a focus position are controlled using a signal from the control circuit 104. In the image sensor unit 5, the tilt angle $\theta t$ with respect to the lens barrel 4 is controlled using a signal from the control circuit 104.

The image processing circuit 103 includes a correction circuit portion that performs correction processing on a signal from the image sensor IS, and a development processing circuit 138 that performs development processing on the corrected signal and converts the signal into a format for storing or transferring the signal. The correction circuit portion includes a color shading correction circuit 131, a luminance shading correction circuit 132 for correcting darkening of a peripheral portion of an image, a white balance adjustment circuit 133 for adjusting a white balance, and the like. The control circuit 104 controls operations of the image sensor IS, the lens barrel 4 and the image processing circuit 103 based on an image signal, a processing result of the image processing circuit 103, or an instruction from a user.

The control circuit 104 also stores an image output from the image processing circuit 103 in the storage unit 105, and transfers an image or data to an external network through a network communication unit 104a.

An operation unit (monitoring apparatus) 102 includes a display unit 134, an operation unit CPU 135 and an operation portion 136, and is communicably connected to the monitoring camera 1 via a communication circuit (communicator) 137. The display unit 134 is, for example, a display apparatus. The display unit 134 displays an image which is acquired via the control circuit 104 and processed by the image processing circuit 103 (video captured by the monitoring camera 1), and an image for guiding an operation of an operator of the operation unit 102. A communication line 137 is, for example, a dedicated line or a public communication network, and connects the control circuit 104 and the operation unit 102 in a wired or wireless manner.

The operation portion 136 is a man-machine interface. By operating the operation portion 136, commands related to a pan/tilt/rotation operation of the monitoring camera 1, a drive operation of the second lens unit L2 and the fourth lens unit L4, a tilt operation of the image sensor unit 5, and a drive operation of the aperture blades of the aperture unit 31 can be input.

The operation unit CPU 135 generates a command signal according to an input from the operation portion 136 and supplies a command signal to the control circuit 104. Therefore, the operator can capture an image of an object under a desired image-capturing condition by operating the operation portion 136 while confirming the image captured by the monitoring camera 1 by using the display unit 134. The operation unit CPU 135 executes various functional operations by executing a program stored in a storage medium such as a not-shown ROM.

<Relationship Between Depth of Field and Tilt Angle>

A relationship between a depth of field of the monitoring camera 1 and the tilt angle will be described with reference to FIGS. 7 to 9.

Figure 7:
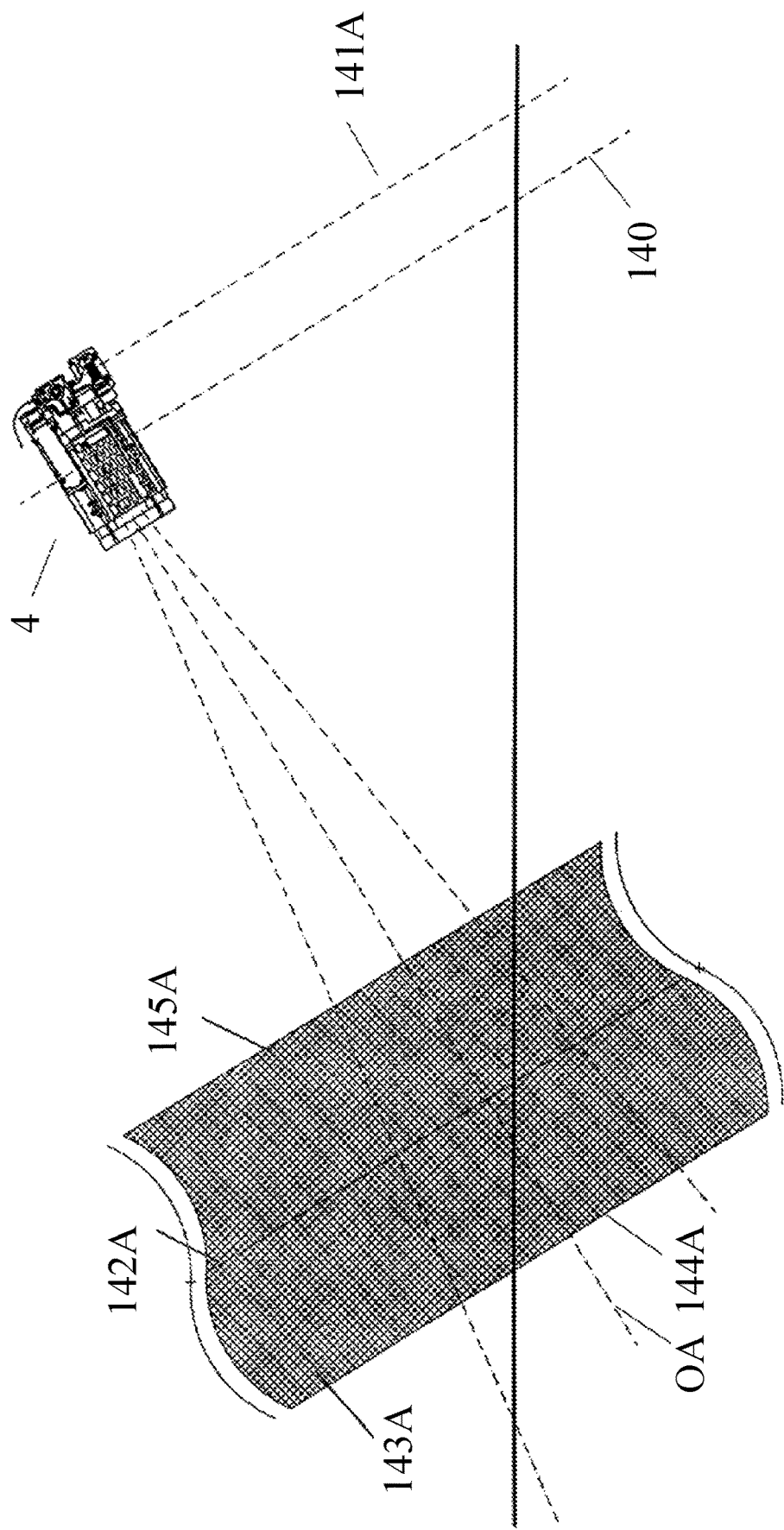
FIG. 7 is a diagram showing a depth of field in a state where a tilt angle of an image sensor unit is zero.

FIG. 7 is a diagram showing a depth of field in a state where the tilt angle θt of the image sensor unit 5 is zero. A lens principal surface 140, an image sensor surface 141A, and an in-focus surface 142A are all parallel. Also, a depth-of-field range 143A is indicated by a meshed area, and has a rear boundary 144A and a front boundary 145A which are parallel to the in-focus surface 142A.

Figure 8:
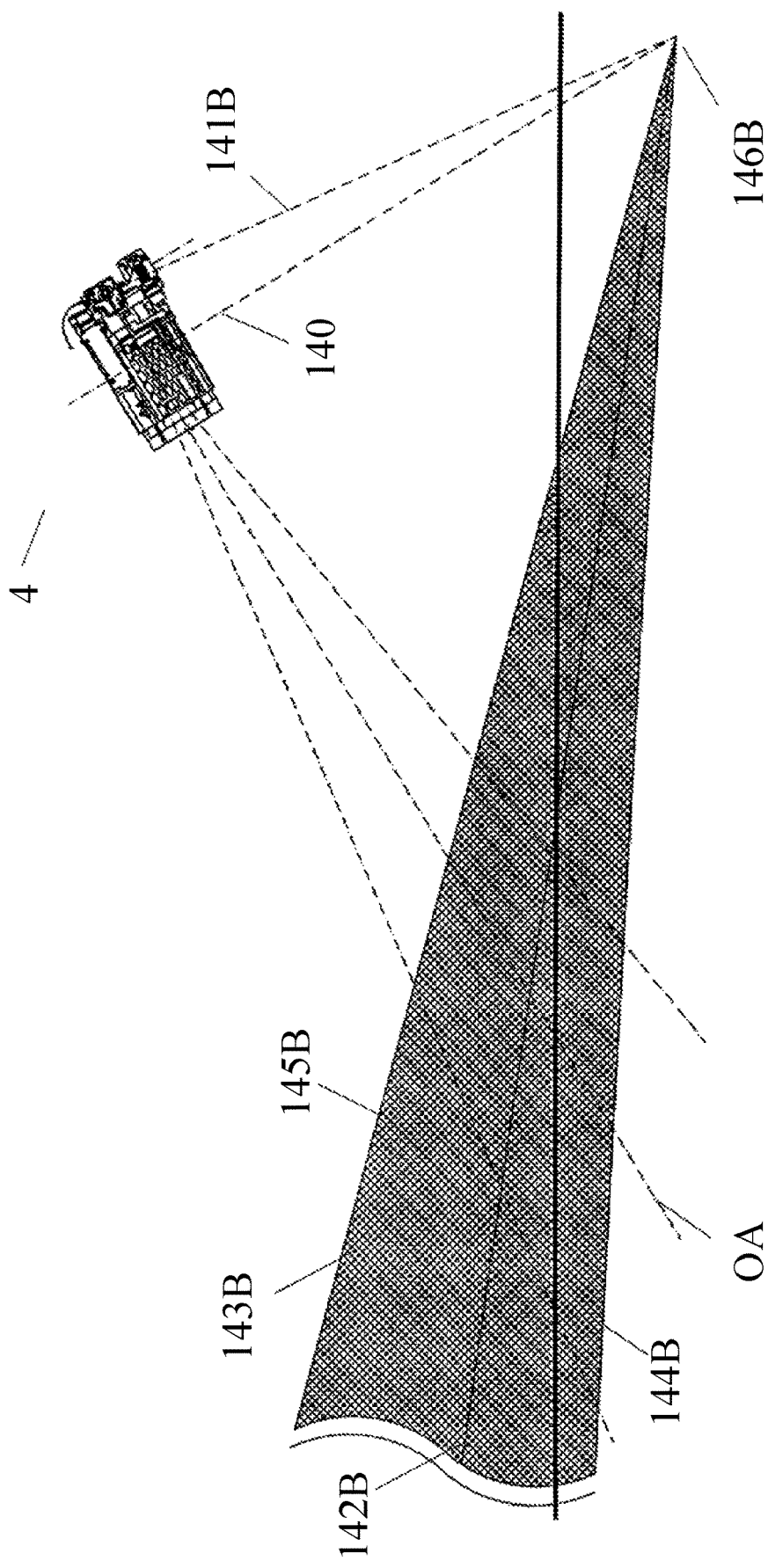
FIG. 8 is a diagram showing a depth of field in a state where a tilt angle of an image sensor unit is not zero.

FIG. 8 is a diagram showing a depth of field in a state where the tilt angle θt of the image sensor unit 5 is not zero. According to the Scheimpler's law, a lens principal surface 140, an image sensor surface 141B, and a in-focus surface 142B intersect at one straight line 146B (the straight line 146B extends in a direction perpendicular to the paper surface of the drawing). A depth-of-field range 143B is indicated by a meshed area and has a rear boundary 144B and a front boundary 145B that intersect at the straight line 146B.

Figure 9:
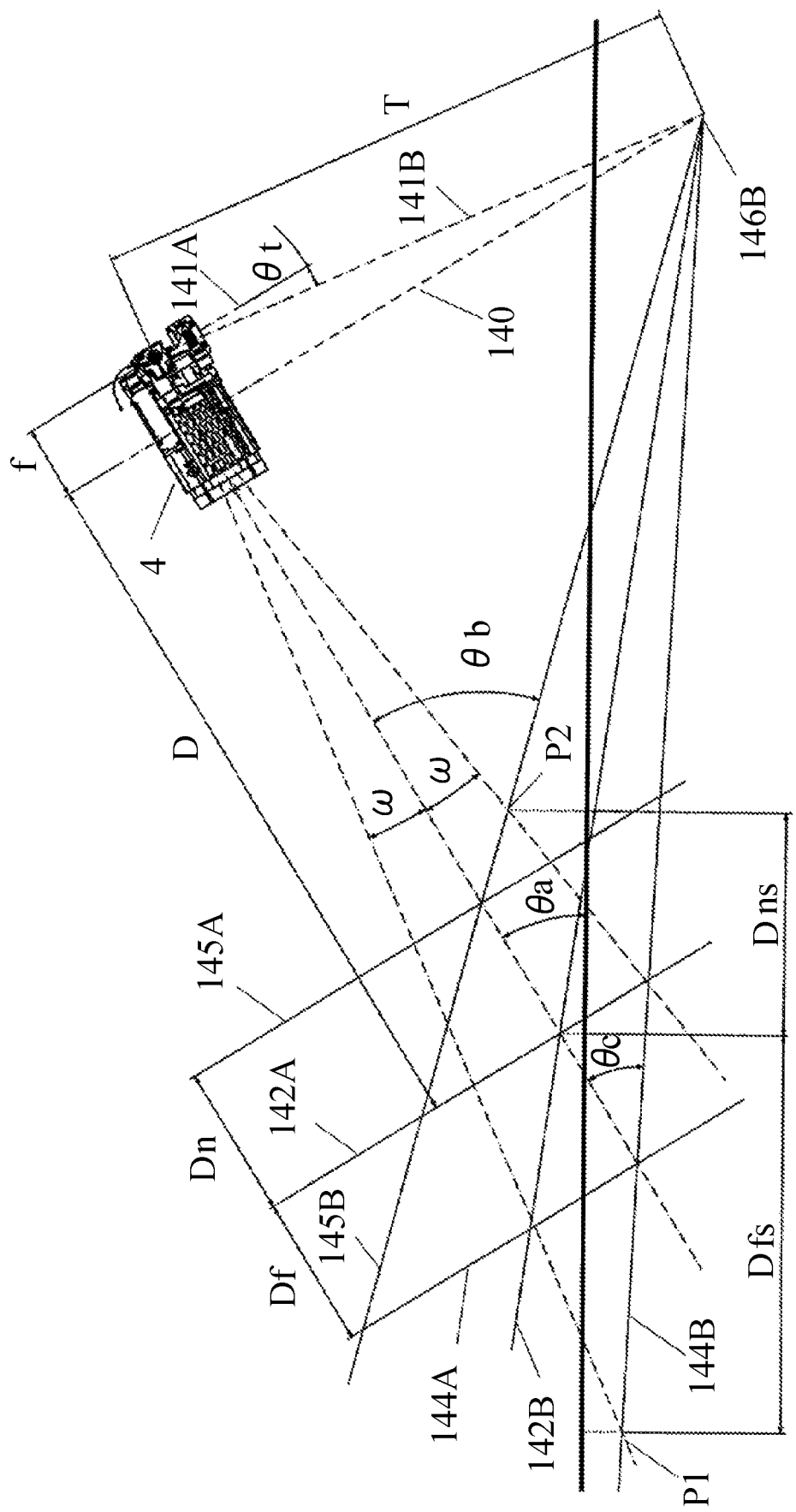
FIG. 9 is a diagram showing various parameters.

FIG. 9 is a diagram showing various parameters. In this embodiment, a current tilt angle of the lens barrel 4 is designated by θa, a current tilt angle of the image sensor unit 5 is designated by θt, an object distance is designated by D, a half angle of view of image-capturing is designated by ω, a lens focal distance is designated by f, and a rear depth of field and a front depth of field in the state where the tilt angle θt is zero are respectively designated by Df and Dn.

The rear depth of field Df and the front depth of field Dn are calculated by the following equations (1) and (2), respectively.

[Equation 1]

$$Df = \frac{\delta \times f \times D^2}{f^2 - \delta \times f \times D} \quad (1)$$

$$Dn = \frac{\delta \times f \times D^2}{f^2 + \delta \times f \times D} \quad (2)$$

Here, δ is a diameter of a permissible circle of confusion of the monitoring camera 1 and F is an aperture value.

A distance T between the optical axis OA and the straight line 146B, an angle θb between the optical axis OA and the front boundary 145B, and an angle θc between the optical axis OA and the rear boundary 144B are, respectively, calculated by the following equations (3) to (5).

[Equation 2]

$$T = \frac{f}{\tan\theta t} \quad (3)$$

$$\theta b = \tan^{-1}\left(\frac{T}{D - Dn}\right) \quad (4)$$

$$\theta c = \tan^{-1}\left(\frac{T}{D + Df}\right) \quad (5)$$

A horizontal distance Dfs between an intersection P1 of the rear boundary 144B with an actual image-capturing range and an intersection of the optical axis OA with the in-focus surface 142B, and a horizontal distance Dns between an intersection P2 of the front boundary 145B with the actual image-capturing range and an intersection of the optical axis OA with the in-focus surface 142B are, respectively, calculated by the following equations (6) and (7).

[Equation 3]

$$Dfs = \frac{\cos(\theta a - \omega) \times T\cos\theta c}{\sin(\theta c - \omega)} - D\cos\theta a \quad (6)$$

$$Dns = D\cos\theta a - \frac{\cos(\theta a + \omega) \times T\cos\theta b}{\sin(\theta b + \omega)} \quad (7)$$

When the tilt angle θt is changed, the horizontal distances Dfs and Dns in the state where the tilt angle θt is not zero also change.

<Method of Shading Correction Corresponding to Tilt Angle of Image Sensor>

The method of shading correction of this embodiment will be described. Shading in this embodiment is a concept including color shading and luminance shading.

FIGS. 10 A to 10D are explanatory views of the color shading. FIG. 10A shows an image-capturing surface of the image sensor IS. FIGS. 10B to 10D respectively show signal intensities and normalized values of a center, a screen edge and both ends of the image sensor IS at the time of image capturing of a uniform white surface. The color shading is a phenomenon in which an intensity ratio of each color signal output from the image sensor IS differs depending on a location of the image sensor IS when an image of a surface having uniform luminance is captured. When the color shading occurs, color unevenness occurs in the captured image. As a factor of the occurrence of the color shading, an incident direction distribution of a light beam is different depending on a position of a pixel in the image sensor IS, so that light from an oblique direction is not sufficiently condensed in a microlens arranged for each pixel on the image sensor IS and the light does not reach a light-receiving portion. Another factor is that the light-receiving portion itself is not disposed at a center of the pixel and is shifted to one side. The color shading also changes depending on conditions of the lens (such as zoom position and aperture condition), because the incident direction distribution of the light beam also changes depending on the conditions of the lens.

FIGS. 11A and 11B are explanatory diagrams of the luminance shading. FIG. 11A shows an image-capturing surface of the image sensor IS. FIG. 11B shows a signal intensity at a time of image-capturing of a uniform white surface. The luminance shading is also called as light falloff at edges and occurs due to lens conditions (such as zoom position and aperture condition). The luminance shading is a phenomenon in which as a distance from the optical axis becomes farther, the luminance decreases when an image of a surface with uniform luminance is captured. The luminance shading tends to be remarkable on a wide-angle lens or a wide-angle side of a zoom lens, and the falloff amount at the maximum aperture tends to be large. One of causes of this phenomenon is vignetting in which a light beam passing through an outer diameter rather than a lens diameter is blocked by the lens barrel 4. In addition, another of the causes is that light extinction occurs by an incidence of a light beam from an oblique direction (cos 4 law).

Hereinafter, a correction method of a color shading correction circuit 131 will be described. FIGS. 12A to 12C show examples of sample data positions for color shading correction. In the following description, although processing on one signal is described as a representative example, processing on each of R signal, G signal, and B signal is actually performed. In this embodiment, M points in a center of an H direction and N points in a center of a V direction are sampled from each color signal of the image sensor IS which captures an image of a uniform white surface as shown in FIG. 12A. Assuming that ff(x) and gg(y) (x and y are positions in the H direction and V direction, respectively) is functions representing a shape of the acquired sampling data, a color shading intensity function H(x, y) is expressed by the following equation (8).

[Equation 4]

$$H(x,y)=ff(x) \times gg(y) \quad (8)$$

Depending on the shape of the acquired sampling data, the color shading intensity function H(x, y) is expressed by the following equation (9).

[Equation 5]

$$H(x,y)=H(r)(r^2=x^2+y^2) \quad (9)$$

Regarding sampling for acquiring the functions ff (x) and gg (y), in order to suppress an influence of shot noise and the like, a value obtained by averaging data in the vicinity of the sampling points is used as sampling data. As the number of pixels to be averaged increases, the influence of shot noise and the like can be suppressed. However, position resolution decreases and a time required for the averaging also increases. Therefore, it is desirable to take an average of several tens to several thousand pixels centering on the sampling points.

If the number of sampling points is increased, a shape of the color shading can be extracted more accurately, so the color shading correction can be performed accurately. However, since it takes time to perform calculation at the time of sampling and calculation of the shape, if the number is increased excessively, management cost will increase. In addition, when the shape is a simple function, particularly when the shape has a uniform inclination, a correction accuracy of the color shading does not improve so much even if the number of samplings is increased.

For example, when there is a color shading of a concentric circle shape as shown in FIG. 12B, a polynomial function (a fourth-order function, in this case) representing the shape of the color shading is approximated by the following equation (10). The constants a to e are determined using, for example, the least squares method so as to minimize a difference from each average value.

[Equation 6]

$$ff(x)=a+bx+cx^2+dx^3+ex^4 \quad (10)$$

Further, for example, when there is a color shading of a shape having a uniform inclination as shown in FIG. 10D, the function ff(x) representing the shape of the color shading is approximated by the following equation (11). The constants a' and b' are determined using, for example, the least squares method so as to minimize a difference from each average value.

[Equation 7]

$$ff(x)=a'+b'x \quad (11)$$

As described above, a calculation time can be shortened by reducing the number of the sampling points and approximating the function representing the shape of the color shading with a linear function. In general, the shape of the color shading is either a concentric circle shape or a shape with a slope, or a combination of both. Therefore, first, the sampling data S1, S2, and Sc at the both ends and the center of the image sensor IS in the H direction or the V direction are obtained and compared. As shown in FIG. 12B, in a case where S1<Sc and S2<Sc and |S1−S2|<ε1, the shape of the color shading is estimated to be a concentric circle shape. Further, as shown in FIG. 12 C, in a case where S1<Sc<S2 and |1−(S2+S1)/2Sc|<ε2 or S2<Sc<S1 and |1−(S2+S1)/2Sc|<ε2, the shape of the color shading is estimated to be a shape having a uniform slope. Here ε1, ε2 are constant values. When the shape of the color shading is estimated to be the shape having a uniform slope, the sampling data S1, S2, and Sc are only used. When the shape of the color shading is estimated to be the concentric circle shape or the shape is estimated to be neither of them, a point to perform the sampling is additionally read out. As described above, a correction value for the color shading can be efficiently obtained by extracting the shape of the color shading and performing the sampling according to the shape. When a point to be sampled is added, the number of pixels for the averaging may be smaller than the beginning, since the number of many sampling data is less influenced by the shot noise. Although only the function ff (x) is described here, the function gg(x) can be obtained in the same manner.

After the color shading intensity function H(x, y) is obtained by the equation (8) or the equation (9), a color shading correction value J(x, y) at each position on the image sensor IS is calculated in the following equation (12).

[Equation 8]

$$J(x, y) = \frac{\max_{x,y} H(x, y)}{H(x, y)} \quad (12)$$

Figures 13A, 13B:
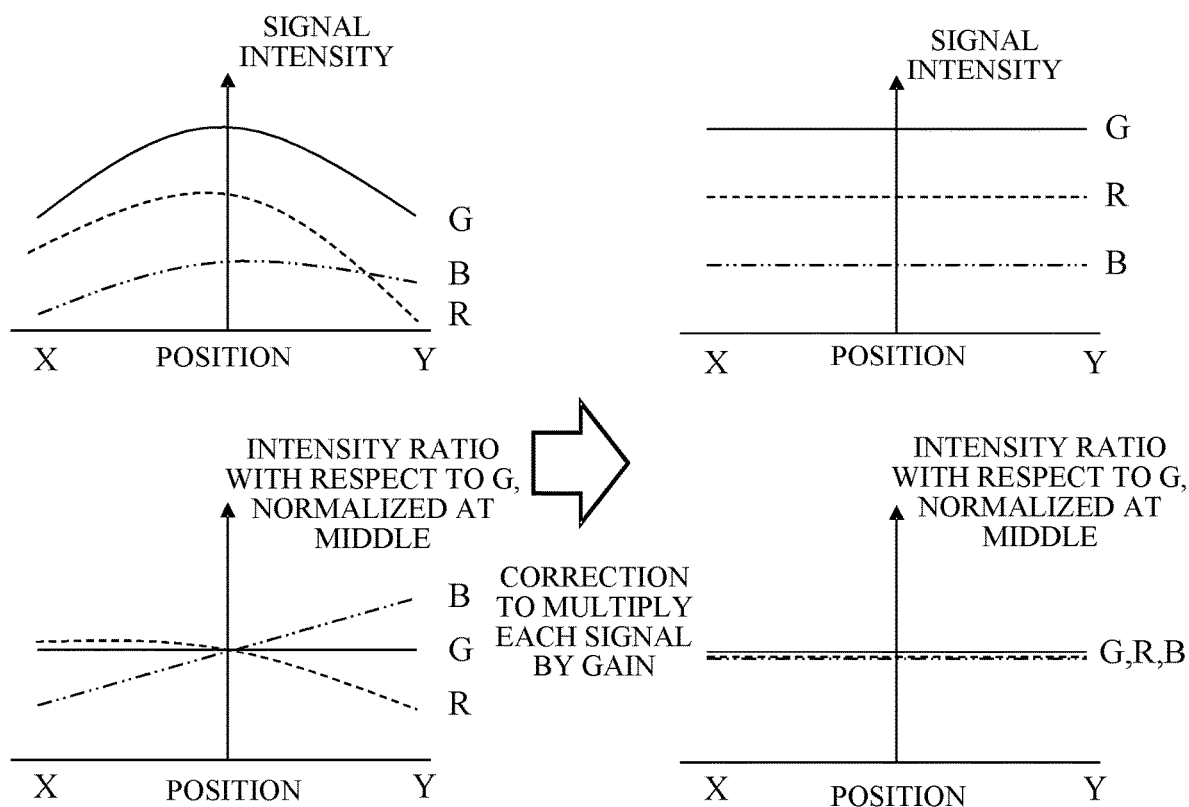
FIGS. 13A and 13B are diagrams showing a color shading correction method.

FIGS. 13A and 13B are diagrams showing a color shading correction method. FIG. 13A and FIG. 13B respectively show signal intensities and normalized values before and after correction. First, a color shading correction value is obtained by using the equation (12) for each color signal obtained as the upper graph of FIG. 13A. Then, by multiplying the color signals by the correction values in a such a way that an output value of each color signal is aligned to a predetermined value in the screen, the upper graph of FIG. 13A becomes like an upper graph of FIG. 13B. Accordingly, an intensity ratio of the color signal becomes constant regardless of locations in the screen. Then, by normalizing the intensity ratio for G in the middle, the upper graph of FIG. 13B becomes like a lower graph of FIG. 13B and the color shading can be corrected. Thereafter, by storing the obtained color shading correction values for RGB in the storage unit 105 as a function of a pixel position (x, y), the color shading can be reduced as shown in the lower graph of FIG. 13B when the color shading occurs.

However, in a case where the lens barrel 4 is a zoom lens or the lens barrel 4 has the aperture unit 31, degree of the color shading is changed depending on the tilt angle θt of the image sensor IS, a zoom position, and an aperture amount. Therefore, there is a necessity to calculate the correction values of the color shading depending on the tilt angle θt of the image sensor IS, the zoom position, and the aperture amount. By sampling the color shading correction values while setting possible values for each parameter, the color shading can be further reduced.

In particular, in a case where the V direction in FIGS. 12A to 12C is the same as the direction of the axis 70A, by setting the function ff(x) to the function ff(x, θt) according to the tilt angle θt, without changing the function gg(y), the color shading intensity function H(x, y) can be calculated corresponding to each tilt angle θt. As a result, data amount stored in the storage unit 105 can be reduced.

Hereinafter, we will explain a method to obtain a correction value when the image sensor IS is inclined by conversion without storing the color shading correction values regarding the tilt angle θt in the storage unit 105 as data for all variables (such as the zoom position and the aperture amount). By not storing the color shading correction value as data, there is no need to measure in advance for all tilt angles θt the color shading correction values, so that a step of measuring the color shading can be reduced.

Figure 14C:
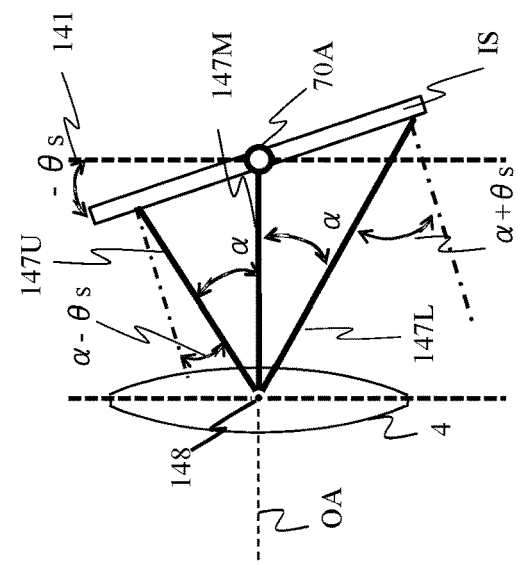
FIGS. 14A to 14C are partial cross-sectional views in a case where an image sensor is inclined with respect to a lens barrel.
Figure 14B:
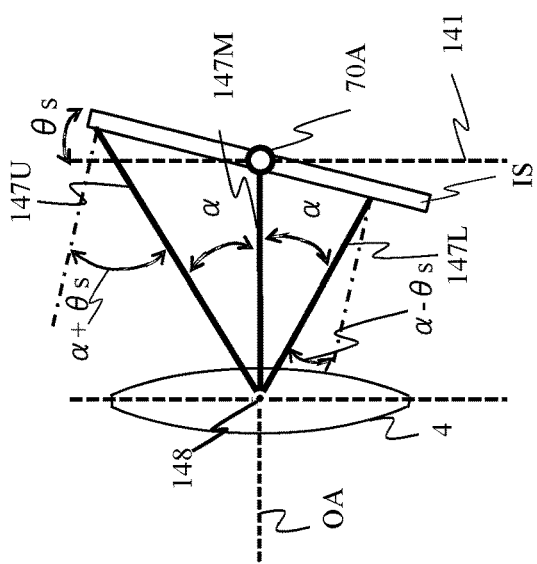
Figure 14A:
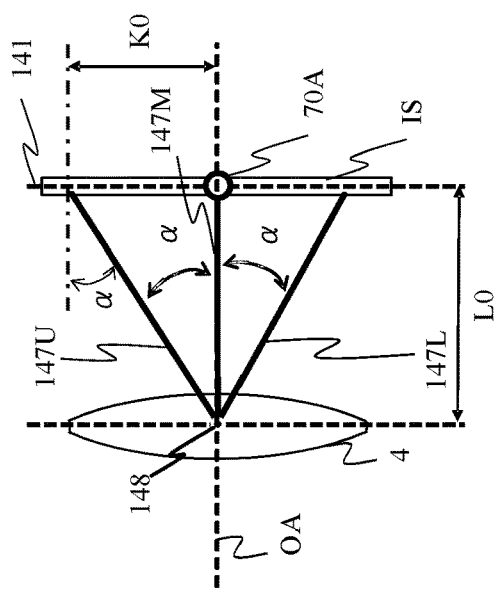

FIGS. 14A to 14C are partial cross-sectional views of a case where the image sensor IS is inclined with respect to lens barrel 4. FIGS. 14A to 14C, respectively, show cases where the tilt angle θt of image sensor IS is 0, θs, and −θs.

As shown in FIG. 14A, let us assume that an incident angle to a pixel corresponding to a principal ray 147U reaching the upper end of the image: sensor IS when the tilt angle θt of image sensor IS is 0 is α. Then, as shown in FIG. 14B, an incident angle to the pixel corresponding to the principal ray 147U reaching the upper end of the image sensor IS when the tilt angle θt of the image sensor IS is θs is expressed by "α+θs". Also, an incident angle to a pixel corresponding to a principal ray 147L reaching the lower end of the image sensor IS is expressed by "α−θs".

Using an exit pupil distance L0 shown in FIGS. 14A to 14C and a distance from the optical axis of each pixel of the graphs of FIGS. 13A and 13B, horizontal axes of the graphs of FIGS. 13A and 13B can be converted to graphs of an incident angle to each pixel. For example, in FIG. 14A, let us assume that a distance between the pixel corresponding to the principal ray 147U reaching the upper end of the image sensor IS and the optical axis is K0. Then, using the following equation (13), the graph of FIG. 13A can be converted to the graph of FIG. 15.

[Equation 9]

$$\alpha = \arctan\frac{K0}{L0} \quad (13)$$

Figure 15:
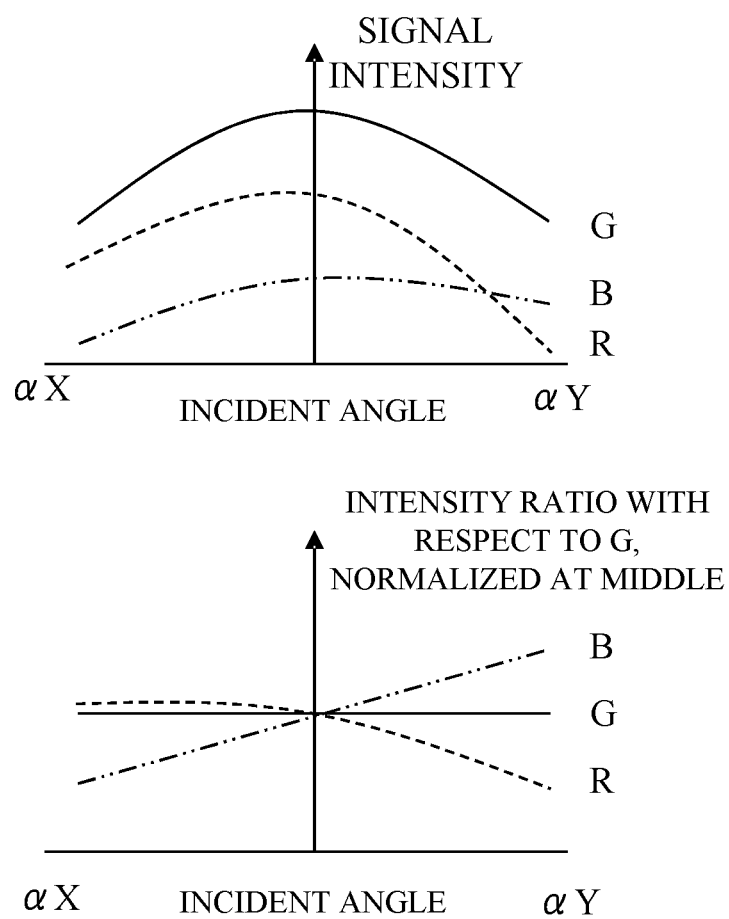
FIG. 15 is a diagram showing how to obtain an incident characteristic function of color shading.

A relationship between the incident angle to each pixel of the image sensor IS and the color shading amount can be graphed by performing the same calculation as that of the equation (13) for each pixel. That is, an incident angle characteristic FF of the color shading can be calculated. Here, αX and αY described in FIG. 15 are angles corresponding to X and Y described in FIGS. 13A and 13B converted using the equation (13).

As described above, in general, the shape of the color shading is either a concentric circle shape or a shape with a slope, or a combination of both. Therefore, it is possible to calculate the correction value of the color shading when the tilt angle of the image sensor IS is θs by measuring in advance which pattern the image sensor IS is applicable to and calculating a correction formula.

In a case where the color shading has symmetry in an axis where the tilt angle θt is 0, the correction value of the color shading when the tilt angle θt is θs can be used as the correction value of the color shading when the tilt angle θt is −θs. For example, in FIG. 14C, when the tilt angle θt is −θs, the incident angle to a pixel corresponding to the principal ray 147U reaching the upper end of the image sensor IS is represented by "α−θs". Also, the incident angle to a pixel corresponding to the principal ray 147L reaching the lower end of the image sensor IS is represented by "α+θs". As described above, in FIG. 14B, the incident angle to the pixel corresponding to the principal ray 147U reaching the upper end of the image sensor IS is represented by "α+θs", and the incident angle to the pixel corresponding to the principal ray 147L reaching the lower end of the image sensor IS is represented by "α−θs". Therefore, the color shading correction value in FIG. 14B can be used as the color shading correction value in FIG. 14C.

We will describe a case where the incident angle characteristic FF of the color shading is symmetrical with respect to the vertical axis (relative output axis) (i.e. FF(x)=FF(−x)) and a case where the tilt angle θt is θs. Then, the incident angle of the pixel on the upper end side is "FF(θs+α)", and the incident angle of the pixel on the lower end side is "FF(θs−α)". Also, in a case where the tilt angle θt is −θs, the incident angle of the pixel on the upper end side is "FF(−(θs−α))=FF(θs−α)", and the incident angle of the pixel on the lower end side is "FF(−(θs+α))=FF(θs+α)". If there is the correction value for the color shading when the tilt angle θt is θs, the correction value for the color shading when the tilt angle θt is −θs can be acquired. Therefore, the number of data of the correction value of the color shading can be reduced. At this time, basically, variables other than the tilt angle θt (such as the zoom position and the aperture amount) are the same.

We will describe a case where the incident angle characteristic FF of the color shading is symmetrical with respect to an intercept b (intersection with the vertical axis) (i.e. case where FF(-x)=-FF(x)+2b is satisfied), and a case where the tilt angle θt is -θs. Then, the incident angle of the pixel on the upper end side is "FF(-(θs-α))=-FF(θs-α)+2b", and the incident angle of the pixel on the lower end side is "FF(-(θs+α))=-FF(θs+α)+2b". Therefore, if the tilt angle θs and the intercept b are known, it is possible to obtain the correction value of the tilt angle -θs.

Also, we will describe a case where the incident angle characteristic FF of the color shading is symmetrical with respect to a straight line of a value β which is the maximum tilt angle θt (i.e. case where FF(x)=FF(x-β) is satisfied) and a case where the tilt angle θt is -θs. Then, the incident angle of the pixel on the upper end side is "FF(θs-β+α)=FF(θs+α)", and the incident angle of the pixel on the lower end side is "FF(θs-β-α)=FF(θs-α)". Therefore, if the tilt angle θs and the value β are known, it is possible to obtain the correction value of the tilt angle θs-β.

Further, as an absolute value of the tilt angle θt of the image sensor IS is increased, there is a tendency that influence on the color shading due to the tilt angle θt is increased. For example, in FIG. 15, it can be seen that the signal intensity is decreased as the incident angle approaches αX, αY Therefore, as a size of the tilt angle θt from a reference angle increases, it is desirable to increase the number of tables or correction formulas of the correction value of the color shading. Here, the reference angle is a tilt angle at a vertex when the shape of the color shading is concentric, and is a tilt angle corresponding to the origin when the shape of the color shading is a linear function. Specifically, by making the number of tables or correction formulas corresponding to a first tilt angle having a size of a first angle with respect to the reference angle equal to or more than the number of tables or correction formulas corresponding to a second tilt angle having a size of a second angle, which is smaller than the first angle, with respect to the reference angle, the influence of the color shading can be further reduced.

As described above, by calculating the incident angle characteristic FF of the color shading, it is possible to calculate the correction value of the color shading without increasing the number of steps.

Figure 16:
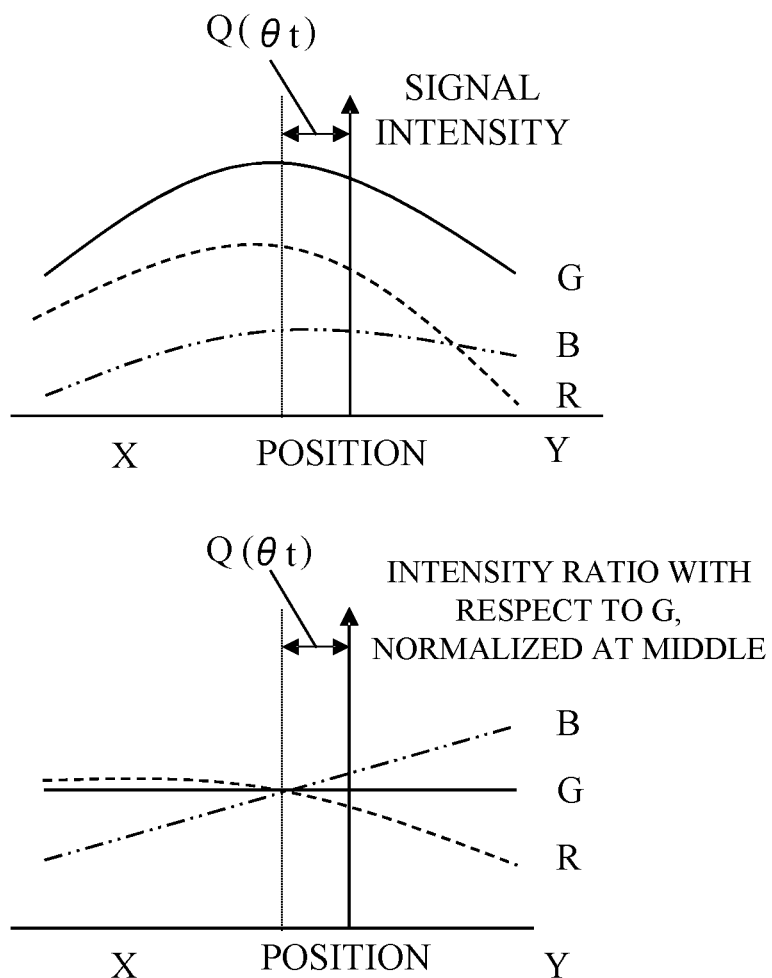
FIG. 16 is a diagram showing how to obtain a function representing characteristics of color shading.

FIG. 16 is a diagram showing how to obtain a function representing a characteristic of the color shading. As shown in FIG. 16, the function ff(x, θt) may be obtained by shifting the graph of FIG. 13A in the horizontal axis direction by a function Q(θt) representing the characteristics of the color shading in accordance with the tilt angle θt. For example, if a value of the tilt angle θt is shifted by one pixel, the function Q(θt) shows a movement of a position by one pixel.

Hereinafter, we will describe the luminance shading correction by a luminance shading correction circuit 132. The luminance shading correction is performed by multiplying the image data by a correction coefficient which is a ratio of an output level of each part of an image stored in the storage unit 105 at the time of capturing a white-all-over image and an output level of an image central part of the image. For example, the correction coefficient Na of the luminance shading correction in area A of FIGS. 11A and 11B is expressed by the following equation (14) when the output level of the central part of the image at the time of capturing the while-all-over image is Oc and the output level of area A at the time of capturing the white-all-over image is Oa.

[Equation 10]

$$Na = \frac{O_c}{O_a} \quad (14)$$

The output of the area A of the finally captured image data is multiplied by the correction coefficient Na. Thus, the luminance shading correction is performed by multiplying the image data for each image position by the correction coefficient according to the image position.

A luminance shading amount changes depending on the tilt angle θt, of the image sensor IS, the zoom position, and the aperture amount, etc. and thus luminance shading data for each the tilt angle θt of the image sensor IS, the zoom position, and the aperture amount is stored in the storage unit 105. The control circuit 104 performs control so that the corresponding luminance shading correction data is output from the storage unit 105 based on the current tilt angle θt of the image sensor IS, the current zoom position, and the current aperture amount. The image data subjected to the luminance shading correction by the luminance shading correction circuit 132 is signal-processed and output as an image having no luminance shading.

As for the luminance shading, we will describe a method of calculating a correction value in the tilt angle θt. The luminance shading may be corrected by multiplying a correction value when the tilt angle θt is 0 by a coefficient N'(θt) which is calculated or measured for each pixel. For example, if a main factor of the occurrence of shading is light falloff at edges, the shading follows the cos 4 law. Assuming that the incident angle to the pixel on the upper end side in FIG. 14A when the tilt angle θt of the image sensor IS is 0 is α, the incident angle to the pixel tilted by the tilt angle θt of the image sensor IS in FIG. 14B becomes "α+θt". Correction of the luminance shading at the tilt angle θt can be performed by multiplying the signal intensity of the pixel on the upper end side when the tilt angle θt is 0 by the coefficient N'(θt) calculated by the following equation (15).

[Equation 11]

$$N'(\theta_t) = \frac{\cos^4(\alpha + \theta_t)}{\cos^4 \alpha} \quad (15)$$

Similarly, the coefficient N'(θt) is calculated for each the incident angle corresponding to each pixel and by multiplying the signal intensity of each pixel when the tilt angle θt by it, it is possible to correct the luminance shading at the time of the tilt angle θt.

Although the specific shading correction method has been described above, the luminance shading may occur simultaneously with the color shading, and may affect the signal intensity of each color. For this reason, it is possible to obtain the correction value of the color shading more effectively by uniformly correcting the luminance shading in advance and suppressing the influence on the signal intensity.

When actually correcting the color shading of the image-capturing apparatus, it is difficult to create a uniform white surface, and unevenness may occur. Therefore, in consideration of the balance between performance and cost, for example, the color shading may not be corrected if the intensity ratio of each signal is within the allowable value.

<Processing Flow of Shading Correction Corresponding to Tilt Angle of Image Sensor IS>

Figure 17:
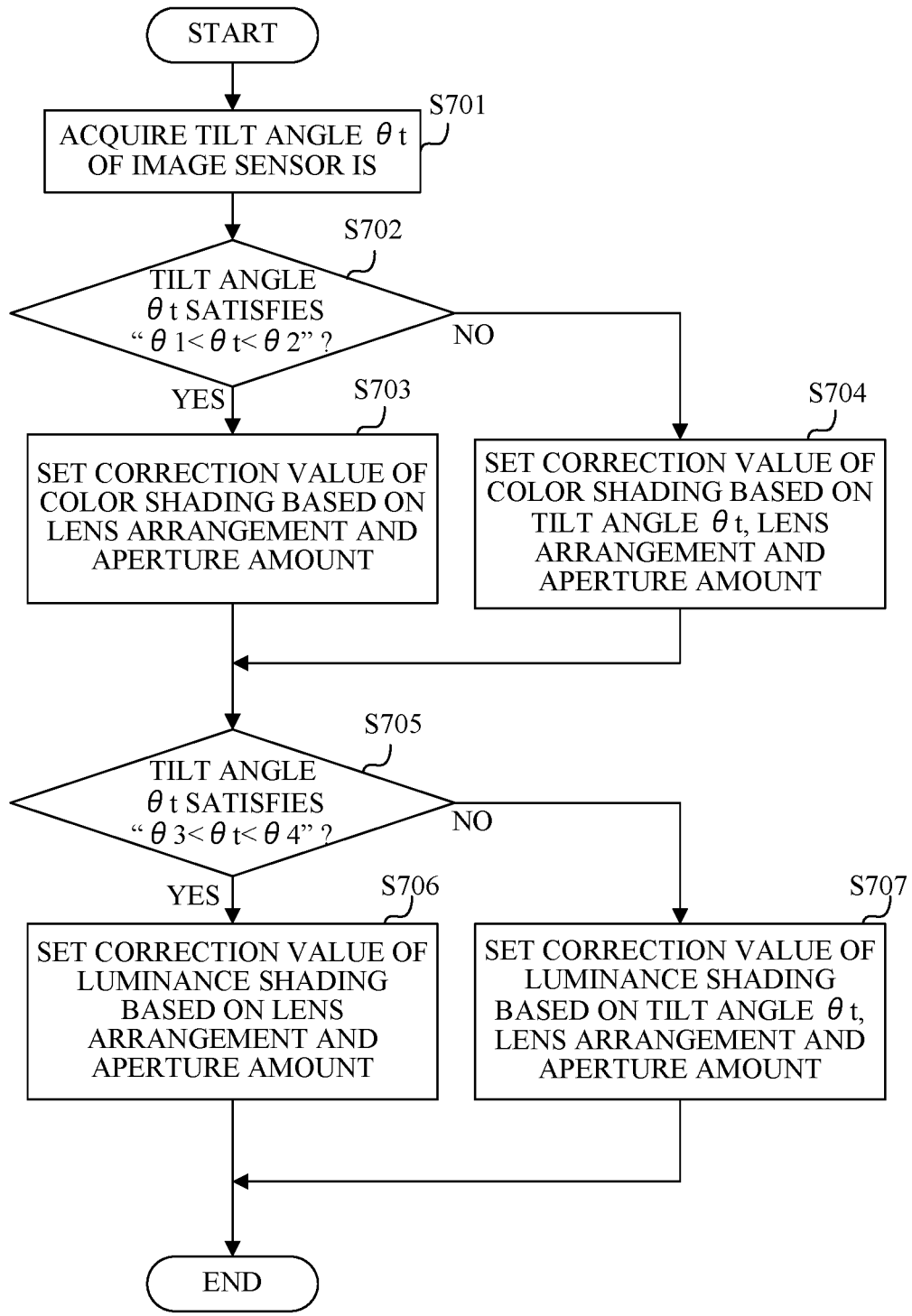
FIG. 17 is a flowchart showing shading correction processing of a first embodiment.

With reference to FIG. 17, shading correction processing corresponding to the tilt angle θt of the image sensor IS of this embodiment will be described. FIG. 17 is a flowchart showing the shading correction processing according to this embodiment. The shading correction processing is performed in parallel with the process of capturing a moving image.

The tilt angle θt, the lens arrangement, and the aperture amount before change are stored in advance in the storage unit 105, and values after the change are also stored. RGB signals from the image sensor IS are continually stored. This process begins when a command value for changing the tilt angle θt is input, and ends when a setting of a correction value for each shading is finished.

In step S701, the control circuit 104 acquires the tilt angle θt of the image sensor IS.

In step S702, the control circuit 104 determines whether the tilt angle θt is larger than a predetermined angle θ1 and is smaller than a predetermined angle θ2 (i.e. "θ1<θt<θ2"). If the tilt angle θt satisfies "θ1<θt<θ2", the process proceeds to step S703, and if not satisfied, the process proceeds to step S704.

In step S703, the control circuit 104 first calls the storage unit 105 for a correction value of the color shading based on the lens arrangement and the aperture amount. Next, the control circuit 104 sets a correction value of the color shading corresponding to each pixel of the image sensor IS in the color shading correction circuit 131.

In step S704, the control circuit 104 first calls the storage unit 105 for the color shading correction value based on the tilt angle θt of the image sensor IS, the lens arrangement, and the aperture amount. Next, the control circuit 104 sets the color shading correction value corresponding to each pixel of the image sensor IS in the color shading correction circuit 131.

In step S705, the control circuit 104 determines whether the tilt angle tθt is larger than a predetermined angle θ3 and is smaller than a predetermined angle θ4 (i.e. "θ3<θt<θ4"). If the tilt angle θt satisfies the "θ3<θt<θ4", the process proceeds to step S706, and if not satisfied, the process proceeds to step S707.

In step S706, the control circuit 104 first calls the storage unit 105 for a correction value of the luminance shading based on the lens arrangement and the aperture amount. Next, the control circuit 104 sets the luminance shading correction value corresponding to each pixel of the image sensor IS in the luminance shading correction circuit 132.

In step S707, the control circuit 104 first calls the storage unit 105 for the luminance shading correction value based on the tilt angle θt of the image sensor IS, the lens arrangement, and the aperture amount. Next, the control circuit 104 sets the luminance shading correction circuit value corresponding to each pixel of the image sensor IS in the luminance shading correction circuit 132.

In this embodiment, in the shading correction, a calculation table based on the tilt angle θt of the image sensor IS, the lens arrangement and the aperture amount is used. It is also possible to use a calculation table in which estimated values are calculated from other calculation parameters without having the calculation table based on the corresponding parameters.

In a case where the shading amount when the tilt angle θt of the image sensor IS, the lens arrangement, and the aperture amount are changed is small, there is an area that does not contribute to an image quality reduction. For example, in a case where an allowable value in which an increase or decrease in the shading amount due to the tilt angle θt may be a few percent is set, the angles θ1 to θ4 may be a numeric value corresponding thereto.

Also, in this embodiment, in ranges other than the range of "θ1<θt<θ2" and "θ3<θt<θ4", the shading correction corresponding to the tilt angle θt of the image sensor IS is performed. However, as the tilt angle θt of the image sensor IS is increased, uneven shading occurs and an area where the shading correction should not be performed may occur. In such a case, the shading corresponding to the tilt angle θt of the image sensor IS may not be performed not only in the range of "θ1<θt<θ2" but also in the range of "θ5<θt<θ6".

In steps S702 and S705, we have used "<(smaller symbol)" as inequality symbol but the inequality symbol may be "≤(smaller or equal symbol)" in at least one of the symbols in the conditions. Also, the shading correction in consideration of the tilt angle θt is performed in the range of "θ1<θt<θ2" and "θ3<θt<θ4".

In this embodiment, the shading correction is performed on all pixels, but the present invention is not limited to this.

Further, the coefficient N'(θt) related to the luminance shading may be a value that changes concentrically with a distance of each pixel from the optical axis OA as a variable.

In this embodiment, although we have explained the configuration where the image sensor IS moves to the tilt angle θt by an input pulse of the stepping motor 63, the monitoring camera 1 may have an angle encoder which measures the tilt angle θt of the image sensor IS. Instead of the stepping motor 63, a handle for a person to turn may be attached. In that case, the shading correction may be performed according to an angle acquired by the angle encoder.

Second Embodiment

In this embodiment, we will describe a shading correction method of the monitoring camera 1 in which a distance between the image sensor IS and the lens barrel 4 changes when a temperature changes. Configurations of the monitoring camera 1 and the image monitoring system are the same as in the first embodiment, and thus detailed description will be omitted.

In this embodiment, for the sake of simplicity, we will describe a case where the image sensor unit 5 thermally expands or contracts only in the optical axis direction with respect to a position of the lens barrel 4 in FIGS. 14A to 14C. However, the present invention is also applicable to a case where the position of the lens barrel 4 shifts in the optical axis direction and the incident angle of the principal ray 147U, 147M, 147L from the lens barrel 4 changes and a case where the image sensor unit 5 moves in a plane perpendicular to the optical axis direction OA.

In this embodiment, a holding position of the lens barrel 4 closest to the image-capturing side from the axis 70A of the image sensor unit 5 is L1. A linear expansion coefficient of a member used between the axis 70A and the lens barrel 4 in the optical axis direction is m, a linear expansion coefficient of the image sensor IS in the image-capturing plane direction is n, and a temperature when data for the shading correction is created or measured is T0. The lens barrel 4 has, for example, a thermocouple, and can measure a temperature of the lens barrel 4 or the image sensor unit 5.

Figure 18:
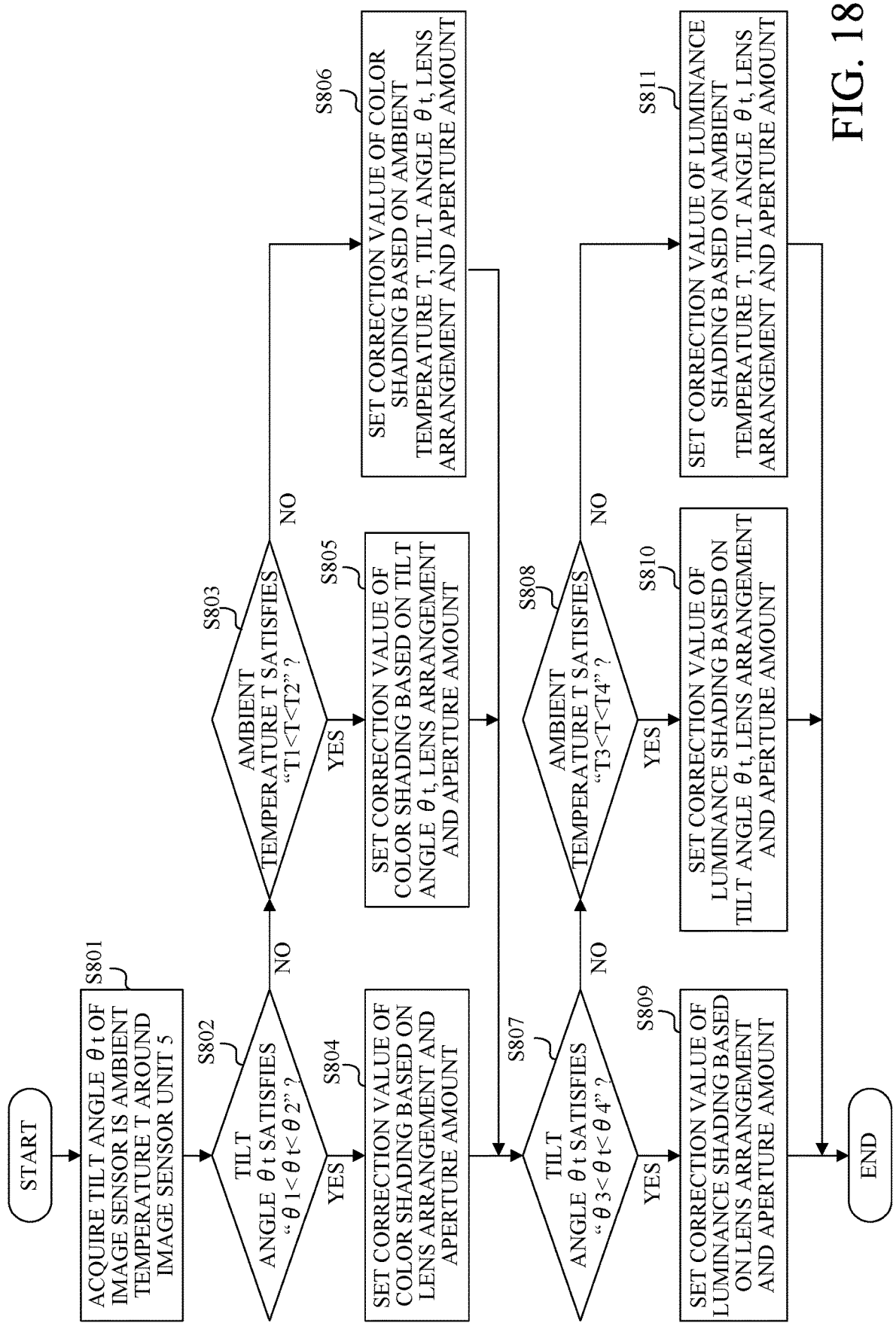
FIG. 18 is a flowchart showing shading correction processing of a second embodiment.

Hereinafter, with reference to FIG. 18, the shading correction processing corresponding to the tilt angle θt of the image sensor IS of this embodiment will be described. FIG. 18 is a flowchart showing the shading correction processing according to this embodiment. The shading correction processing is performed in parallel with the processing of capturing a moving image.

The tilt angle θt, the lens arrangement, and the aperture amount before change are stored in advance in the storage unit 105, and values after the change are also stored. RGB signals from the image sensor IS are continually stored. This process begins when a command value for changing the tilt angle θt is input, and ends when a setting of a correction value for each shading is finished.

In step S801, the control circuit 104 obtains the tilt angle θt of the image sensor IS from the storage unit 105 or a sensor and ambient temperature T around the image sensor unit 5.

In step S802, the control circuit 104 determines whether the tilt angle θt is larger than the predetermined angle θ1 and smaller than the predetermined angle θ2 (i.e. θ1<θt<θ2). If the tilt angle θt satisfies "θ1<θt<θ2", the process proceeds to step S804, and if not satisfied, the process proceeds to step S803.

In step S803, the control circuit 104 determines whether the ambient temperature T is higher than a predetermined temperature T1 and lower than a predetermined temperature T2 (i.e. "T1<T<T2"). If the ambient temperature T satisfies "T1<T<T2", the process proceeds to step S805. If not satisfied, the process proceeds to step S806.

In step S804, the control circuit 104 first calls the storage unit 105 for the color shading correction value based on the lens arrangement and the aperture amount. Next, the control circuit 104 sets the color shading correction value corresponding to each pixel of the image sensor IS in the color shading correction circuit 131.

In step S805, the control circuit 104 first calls the storage unit 105 for the color shading correction value based on the tilt angle θt of the image sensor IS, the lens arrangement and the aperture amount. Next, the control circuit 104 sets the color shading correction value corresponding to each pixel of the image sensor IS in the color shading correction circuit 131.

In step S806, the control circuit 104 calls the storage unit 105 for the color shading correction value based on the ambient temperature T, the tilt angle θt of the image sensor IS, the lens arrangement and the aperture amount. Next, the control circuit 104 sets the color shading correction value corresponding to each pixel of the image sensor IS in the color shading correction circuit 131.

At this time, using the ambient temperature T, an expanded length ΔL becomes L1×m×(T−T0), and at the temperature T0, an expanded distance ΔK of a pixel separated by a distance K0 on the image sensor IS from the optical axis OA becomes K0×n×(T−T0). Therefore, an incident angle α' to a pixel of image sensor IS at the ambient temperature T is expressed by the following equation (16).

[Equation 12]

$$\alpha' = \arctan \frac{(K_0 + \Delta K)}{(L_1 + \Delta L)} \quad (16)$$

Therefore, correction calculation is performed with the incident angle as "α'+θ".

In step S807, the control circuit 104 determines whether the tilt angle θt is larger than the predetermined angle θ3 and smaller than the predetermined angle θ4 (i.e. "θ3<θt<θ4").

If the tilt angle θt satisfies the "θ3<θt<θ4", the process proceeds to step S809, and if not satisfied, the process proceeds to step S808.

In step 808, the control circuit 104 determines whether the temperature T is higher than a predetermined temperature T3 and lower than a predetermined temperature T4 (i.e. "T3<T<T4"). If the ambient temperature T satisfies "T3<T<T4", the process proceeds to step S810, and if not satisfied, the process proceeds to step S811.

In step S809, the control circuit 104 first calls the storage unit 105 for the luminance shading correction value based on the lens arrangement and the aperture amount. Next, the control circuit 104 sets the luminance shading correction value corresponding to each pixel of the image sensor IS in the luminance shading correction circuit 132.

In step S810, the control circuit 104 first calls the storage unit 105 for the luminance shading correction value based on the tilt angle θt of the image sensor IS, the lens arrangement and the aperture amount. Next, the control circuit 104 sets the luminance shading correction value corresponding to each pixel of the image sensor IS in the luminance shading correction circuit 132.

In step S811, the control circuit 104 first calls the storage unit 105 for the luminance shading correction value based on the ambient temperature T, the tilt angle θt of the image sensor IS, the lens arrangement and the aperture amount. Next, the control circuit 104 sets the luminance shading correction value corresponding to each pixel of the image sensor IS in the color shading correction circuit 132. In this step, as in step S806, calculation is performed by setting the incident angle to "α'+θt".

Under high temperature and low temperature, if the image sensor IS is greatly inclined, an influence of the shading becomes noticeable. In this embodiment, by using the above-described correction method, the shading can be appropriately corrected even in a state where tilt image capturing is performed at the high temperature or the low temperature. Therefore, it is possible to suppress an image quality reduction due to the shading even in the state of the tilt image capturing The processes in step S802 and step S803 and the processes in step S807 and step S808 are interchangeable, and the order may be interchanged.

Third Embodiment

In this embodiment, the monitoring camera 1 is an interchangeable lens type image-capturing apparatus and performs tilt image capturing. The other configurations of the monitoring camera 1 and the image monitoring system are the same as in the first embodiment, and thus detailed description will be omitted.

In this embodiment, the storage unit 105 stores a shading correction coefficient table which is data of the shading correction coefficient. In the shading correction coefficient table, shading correction coefficients are listed for each lens ID for specifying lens type. The lens shading correction coefficient table may be stored on the network. In this case, the shading correction coefficient table may be obtained according to the lens ID.

Figure 19:
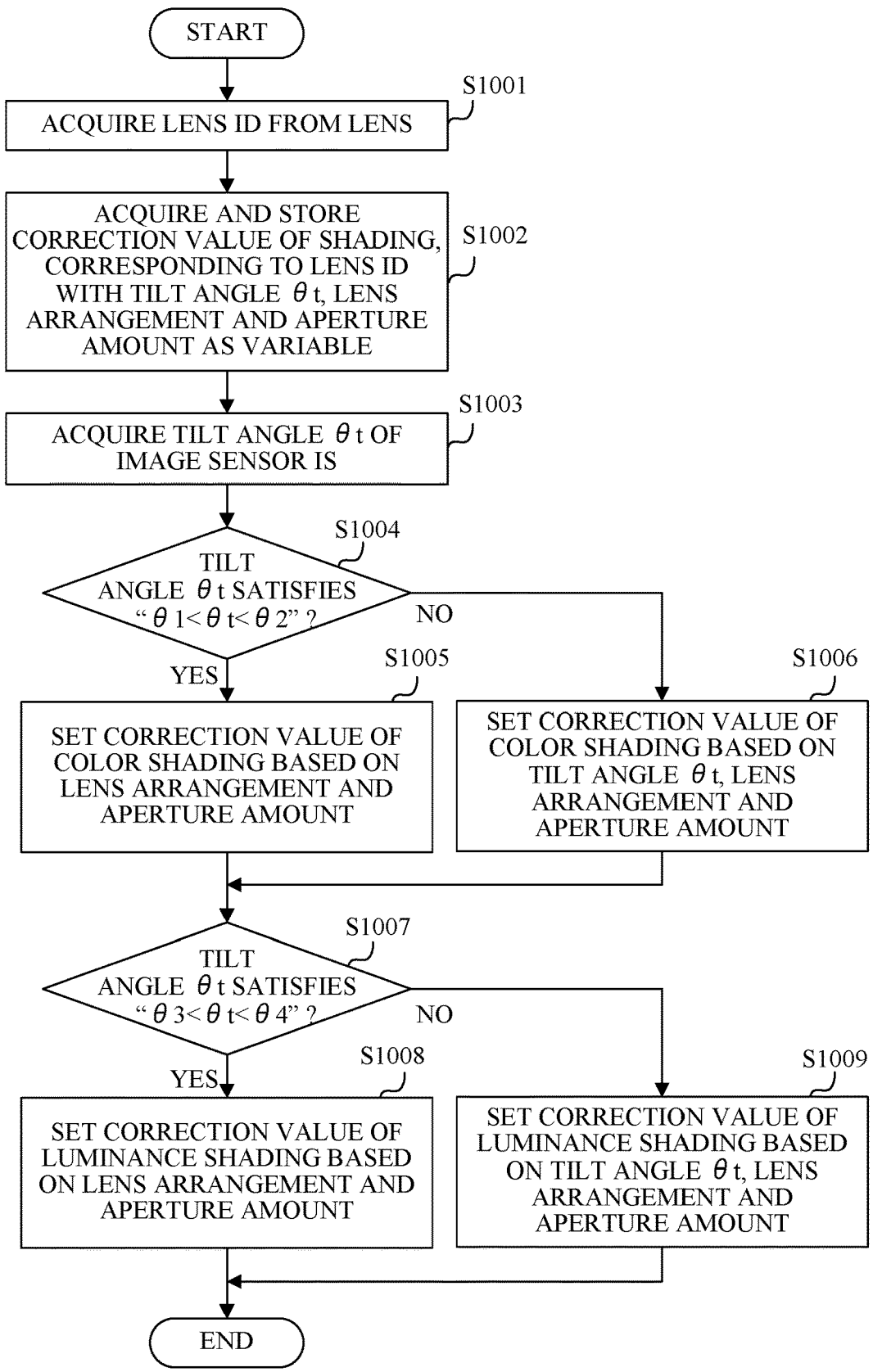
FIG. 19 is a flowchart showing shading correction processing of a third embodiment.

Hereinafter, with reference to FIG. 19, the shading correction processing of this embodiment will be described. FIG. 19 is a flowchart showing the shading correction processing according to this embodiment. The shading correction processing is performed in parallel with the process of capturing a moving image.

The tilt angle θt, the lens arrangement, and the aperture amount before change are stored in advance in the storage unit 105, and values after the change are also stored. RGB signals from the image sensor IS are continually stored. This process begins when a command value for changing the tilt angle θt is input, and ends when a setting of a correction value for each shading is finished.

In step S1001, the control circuit 104 acquires, from the lens barrel 4, a lens ID for specifying the lens type.

In step S1002, the control circuit 104 acquires the shading correction coefficient table, corresponding to the lens ID, with the tilt angle θt of the image sensor IS, the lens arrangement, and the aperture amount as variable. The acquired shading correction coefficient table may be stored in the storage unit 105 or may be stored in the interchangeable lens.

In step S1003, the control circuit 104 acquires the tilt angle θt of the image sensor IS.

In step S1004, the control circuit 104 determines whether the tilt angle θt is larger than the predetermined angle θ1 and smaller than the predetermined angle θ2 (i.e. θ1<θt<θ2). If the tilt angle θt satisfies "θ1<θt<θ2", the process proceeds to step S1005, and if not satisfied, the process proceeds to step S1006.

In step S1005, the control circuit 104 first calls the storage unit 105 for the color shading correction value based on the lens arrangement and the aperture amount. Next, the control circuit 104 sets the color shading correction value corresponding to each pixel of the image sensor IS in the color shading correction circuit 131.

In step S1006, the control circuit 104 first calls the storage unit 105 for the color shading correction value based on the tilt angle θt of the image sensor IS, the lens arrangement and the aperture amount. Next, the control circuit 104 sets the color shading correction value corresponding to each pixel of the image sensor IS in the color shading correction circuit 131.

In step S1007, the control circuit 104 determines whether the tilt angle θt is larger than the predetermined angle θ3 and smaller than the predetermined angle θ4 (i.e. θ3<θt<θ4). If the tilt angle θt satisfies "θ3<θt<θ4", the process proceeds to step S1008, and if not satisfied, the process proceeds to step S1009.

In step S1008, the control circuit 104 first calls the storage unit 105 for the luminance shading correction value based on the lens arrangement and the aperture amount. Next, the control circuit 104 sets the luminance shading correction value corresponding to each pixel of the image sensor IS in the color shading correction circuit 132.

In step S1009, the control circuit 104 first calls the storage unit 105 for the luminance shading correction value based on the tilt angle θt of the image sensor IS, the lens arrangement and the aperture amount. Next, the control circuit 104 sets the luminance shading correction value corresponding to each pixel of the image sensor IS in the color shading correction circuit 131.

In this embodiment, in the shading correction, a calculation table based on the tilt angle θt of the image sensor IS, the lens arrangement, and the aperture amount is used. It is also possible to use a calculation table in which estimated values are calculated from other calculation parameters without having the calculation table based on the corresponding parameters.

When the interchangeable lens changes, the shading correction value changes. Therefore, the tilt angle θt may be returned to 0 and the shading may be returned to the minimum. From there, the shading correction value and the tilt angle may be returned to appropriate values.

In this embodiment, even after the tilt angle θt of the image sensor IS changes, an image quality reduction can be suppressed by changing the shading correction value depending on the tilt angle θt.

<Other Modifications>

Although the stepping motor is used in the embodiments described above, the present invention is not limited thereto. Instead of the stepping motor, other motors or actuators such as servomotor may be used.

In the above-described embodiments, the color shading and the luminance shading are corrected in a specific order, but the order may be reversed, or only one of them may be corrected.

Further, in the above-described embodiments, in a case where the tilt angle θt is within a certain range, the shading correction is performed according to the lens arrangement and the aperture shape, but this also includes a case that the shading correction itself is not performed at all.

Although the aperture amount and the lens arrangement have been mentioned as correction methods of the color shading and the luminance shading, the correction methods may be based on only one parameter or may not be based on both parameters. Also, the shading correction value may be changed based on other parameters.

In addition, the second embodiment and the third embodiment may be combined, and a part of the embodiments may be combined with the other embodiments.

Each function performed by the control circuit 104 may be performed, instead of the control circuit 104, by hardware. Also, it may be implemented by a programmable logic device such as an FPGA (Field Programmable Gate Array) or a DSP (Digital Signal Processor).

The present invention can be also realized in processing where a program that implements one or more functions of the above-described embodiments is supplied to a system or apparatus via a network or storage medium, and one or more processors in a computer of the system or apparatus read and execute the program. It can also be realized by a circuit that realizes one or more functions (for example, an application-specific integrated circuit (ASIC)).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-166122, filed on Sep. 5, 2018 which is hereby incorporated by reference herein in its entirety.

What is claimed is:

1. An image-capturing apparatus comprising:
an image sensor;
a hardware processor; and
a memory for storing instructions to be executed by the hardware processor,
wherein, when the instructions stored in the memory are executed by the hardware processor, the instructions cause the image-capturing apparatus to:
incline the image sensor with respect to a plane perpendicular to an optical axis of an image-capturing optical system; and
perform shading correction on an image-capturing signal based on an inclination angle of the image sensor with respect to the plane perpendicular to the optical axis,
wherein when an incident angle of a light ray incident to a predetermined pixel of the image sensor is α and an inclination angle of the image sensor with respect to the plane perpendicular to the optical axis is θ, the shading correction is performed using a table or correction formula corresponding to an angle of θ+α.

2. The image-capturing apparatus according to claim 1, wherein the number of tables or correction formulas for the shading correction in a case where the inclination angle is a first angle with respect to a reference value is equal to or more than the number of tables or correction formulas for the shading correction in a case where the inclination angle is a second angle smaller than the first angle with respect to the reference value.

3. The image-capturing apparatus according to claim 1, wherein the shading correction is performed using tables or correction formulas corresponding to each of first and second directions in an image-capturing plane of the image sensor, the first and second directions being orthogonal to each other, and
wherein the shading correction is performed using a table or correction formula corresponding to the inclination angle in the first direction.

4. The image-capturing apparatus according to claim 1, wherein the shading correction is performed based on an amount of light passing through the image-capturing optical system, the amount being adjusted by a light amount adjuster.

5. The image-capturing apparatus according to claim 1, wherein the shading correction is performed based on an arrangement of the image-capturing optical system.

6. The image-capturing apparatus according to claim 1, wherein the shading correction is performed based on at least one of a temperature of the image sensor and a temperature of the image-capturing optical system in a case where the at least one of the temperature of the image sensor and the temperature of the image-capturing optical system is included in a predetermined range.

7. The image-capturing apparatus according to claim 1, wherein the shading correction is performed based on lens ID of a lens barrel in which the image-capturing optical system is provided.

8. The image-capturing apparatus according to claim 1, wherein at least one of color shading and luminance shading is corrected.

9. The image-capturing apparatus according to claim 1, wherein, when the instructions stored in the memory are executed by the hardware processor, the instructions further cause the image-capturing apparatus to:
measure the inclination angle.

10. A method for controlling an image-capturing apparatus comprising an image sensor, a hardware processor, and a memory for storing instructions that, when executed by the hardware processor, cause the image-capturing apparatus to incline the image sensor with respect to a plane perpendicular to an optical axis of an image-capturing optical system, the method comprising:
determining whether an inclination angle of the image sensor with respect to the plane is larger than a predetermined angle or not; and
performing shading correction on an image-capturing signal based on the inclination angle of the image sensor with respect to the plane perpendicular to the optical axis,
wherein when an incident angle of a light ray incident to a predetermined pixel of the image sensor is α and an inclination angle of the image sensor with respect to the plane perpendicular to the optical axis is θ, the shading correction is performed using a table or correction formula corresponding to an angle of θ+α.

11. A non-transitory computer-readable storage medium storing a computer program for controlling an image-capturing apparatus comprising an image sensor, a hardware processor, and a memory for storing instructions that, when executed by the hardware processor, cause the image-capturing apparatus to incline the image sensor with respect to a plane perpendicular to an optical axis of an image-capturing optical system, the computer program executing a method that comprises:
determining whether an inclination angle of the image sensor with respect to the plane is larger than a predetermined angle or not; and
performing shading correction on an image-capturing signal based on the inclination angle of the image sensor with respect to the plane perpendicular to the optical axis,
wherein when an incident angle of a light ray incident to a predetermined pixel of the image sensor is α and an inclination angle of the image sensor with respect to the plane perpendicular to the optical axis is θ, the shading correction is performed using a table or correction formula corresponding to an angle of θ+α.

* * * * *